US011131540B2

(12) United States Patent
Orban et al.

(10) Patent No.: US 11,131,540 B2
(45) Date of Patent: Sep. 28, 2021

(54) TUBULAR MEASUREMENT

(71) Applicant: SCHLUMBERGER TECHNOLOGY CORPORATION, Sugar Land, TX (US)

(72) Inventors: Jacques Orban, Katy, TX (US); Shunfeng Zheng, Katy, TX (US); Vishwanathan Parmeshwar, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 354 days.

(21) Appl. No.: 16/072,658

(22) PCT Filed: Jan. 26, 2017

(86) PCT No.: PCT/US2017/015003
§ 371 (c)(1),
(2) Date: Jul. 25, 2018

(87) PCT Pub. No.: WO2017/132297
PCT Pub. Date: Aug. 3, 2017

(65) Prior Publication Data
US 2020/0278193 A1 Sep. 3, 2020

Related U.S. Application Data

(60) Provisional application No. 62/287,097, filed on Jan. 26, 2016, provisional application No. 62/341,522, filed on May 25, 2016.

(51) Int. Cl.
*G01B 11/14* (2006.01)
*E21B 47/00* (2012.01)
(Continued)

(52) U.S. Cl.
CPC .............. *G01B 11/14* (2013.01); *E21B 47/00* (2013.01); *G01B 11/02* (2013.01);
(Continued)

(58) Field of Classification Search
CPC .......... E21B 47/00; E21B 19/07; E21B 19/10; E21B 19/14; E21B 19/155; E21B 19/161;
(Continued)

(56) References Cited

U.S. PATENT DOCUMENTS 4,459,752 A   7/1984 Babcock
5,107,705 A   4/1992 Wraight et al.
(Continued)

FOREIGN PATENT DOCUMENTS

RU   2324812 C1   5/2008
RU   2593609 C1   8/2016
(Continued)

OTHER PUBLICATIONS

Office Action and Search Report issued in Russian Patent Application No. 2018145326/03 dated Aug. 10, 2020; 12 pages (with English translation).

*Primary Examiner* — Michael R Wills, III
(74) *Attorney, Agent, or Firm* — Jeffrey D. Frantz

(57) ABSTRACT

A tubular measuring system having a sensor at a predetermined position with respect to a datum and a processing device comprising a processor and a memory storing computer program code in signal communication with the sensor. The sensor generates a signal indicative of a feature of a tubular, and the processing device receives and processes the signal to determine position of the feature of the tubular with respect to the datum.

48 Claims, 11 Drawing Sheets

(51) Int. Cl.
*G01B 11/24* (2006.01)
*G01B 11/02* (2006.01)
*E21B 19/07* (2006.01)
*E21B 19/10* (2006.01)
*E21B 19/14* (2006.01)
*E21B 19/15* (2006.01)
*E21B 19/16* (2006.01)

(52) U.S. Cl.
CPC .......... *G01B 11/2433* (2013.01); *E21B 19/07* (2013.01); *E21B 19/10* (2013.01); *E21B 19/14* (2013.01); *E21B 19/155* (2013.01); *E21B 19/161* (2013.01)

(58) Field of Classification Search
CPC ....... E21B 47/04; E21B 17/006; G01B 11/14; G01B 11/2433; G01B 11/02
See application file for complete search history.

(56) References Cited

U.S. PATENT DOCUMENTS

| | | | |
|---|---|---|---|
| 6,892,812 B2 | 5/2005 | Niedermayr et al. |
| 6,896,055 B2 | 5/2005 | Koithan |
| 6,931,621 B2 | 8/2005 | Green et al. |
| 7,172,037 B2 | 2/2007 | Dashevskiy et al. |
| 7,264,050 B2 | 9/2007 | Koithan et al. |
| 7,357,196 B2 | 4/2008 | Goldman et al. |
| 7,860,593 B2 | 12/2010 | Boone |
| 7,938,197 B2 | 5/2011 | Boone et al. |
| 8,121,971 B2 | 2/2012 | Edwards et al. |
| 8,215,417 B2 | 7/2012 | Annaiyappa et al. |
| 8,250,816 B2 | 8/2012 | Donnally et al. |
| 8,386,059 B2 | 2/2013 | Boone |
| 8,590,635 B2 | 11/2013 | Koederitz |
| 8,718,802 B2 | 5/2014 | Boone |
| 9,027,671 B2 | 5/2015 | Koederitz |
| 9,223,594 B2 | 12/2015 | Brown et al. |
| 9,285,794 B2 | 3/2016 | Wang et al. |
| 9,410,417 B2 | 8/2016 | Reckmann et al. |
| 9,429,009 B2 | 8/2016 | Paulk et al. |
| 9,436,173 B2 | 9/2016 | Wang et al. |
| 9,506,336 B2 | 11/2016 | Orbell |
| 9,528,364 B2 | 12/2016 | Samuel et al. |
| 9,593,567 B2 | 3/2017 | Pink et al. |
| 9,598,947 B2 | 3/2017 | Wang et al. |
| 9,784,089 B2 | 10/2017 | Boone et al. |
| 9,828,845 B2 | 11/2017 | Kpetehoto et al. |
| 9,896,925 B2 | 2/2018 | Hernandez et al. |
| 9,933,919 B2 | 4/2018 | Raja et al. |
| 9,934,338 B2 | 4/2018 | Germain et al. |
| 9,938,816 B2 | 4/2018 | Astrid et al. |
| 9,946,445 B2 | 4/2018 | Whalley |
| 9,959,022 B2 | 5/2018 | Anghelescu et al. |
| 9,988,880 B2 | 6/2018 | Dykstra |
| 9,995,129 B2 | 6/2018 | Dykstra et al. |
| 10,113,408 B2 | 10/2018 | Pobedinski et al. |
| 10,138,722 B2 | 11/2018 | Magnuson |
| 2007/0097789 A1 | 5/2007 | Coffey |
| 2008/0105427 A1 | 5/2008 | Hampton et al. |
| 2013/0271576 A1 | 10/2013 | Ellis |
| 2013/0275100 A1 | 10/2013 | Ellis et al. |
| 2014/0210821 A1 | 7/2014 | Kapoor et al. |
| 2014/0233804 A1 | 8/2014 | Gustavsson et al. |
| 2014/0353033 A1 | 12/2014 | Pink et al. |
| 2015/0345261 A1 | 12/2015 | Kruspe et al. |
| 2015/0369030 A1 | 12/2015 | Hay et al. |
| 2016/0024906 A1 | 1/2016 | Jamison et al. |
| 2017/0308802 A1 | 10/2017 | Ramsoy et al. |
| 2018/0156023 A1 | 6/2018 | Dykstra et al. |
| 2018/0298693 A1 | 10/2018 | Van Duivendijk et al. |
| 2018/0298694 A1 | 10/2018 | Van Duivendijk et al. |
| 2018/0328159 A1 | 11/2018 | Mandava et al. |
| 2018/0334887 A1 | 11/2018 | Dashevskiy et al. |

FOREIGN PATENT DOCUMENTS

| | | |
|---|---|---|
| WO | 03087714 A1 | 10/2003 |
| WO | 2012038863 A1 | 3/2012 |
| WO | 2017204655 A1 | 11/2017 |
| WO | 2018186745 A1 | 10/2018 |

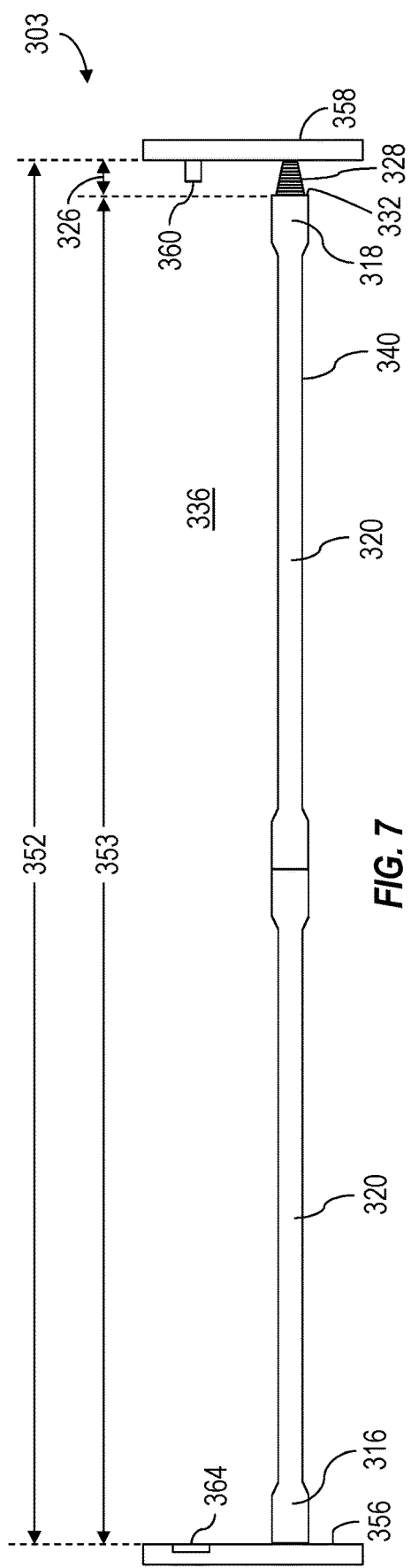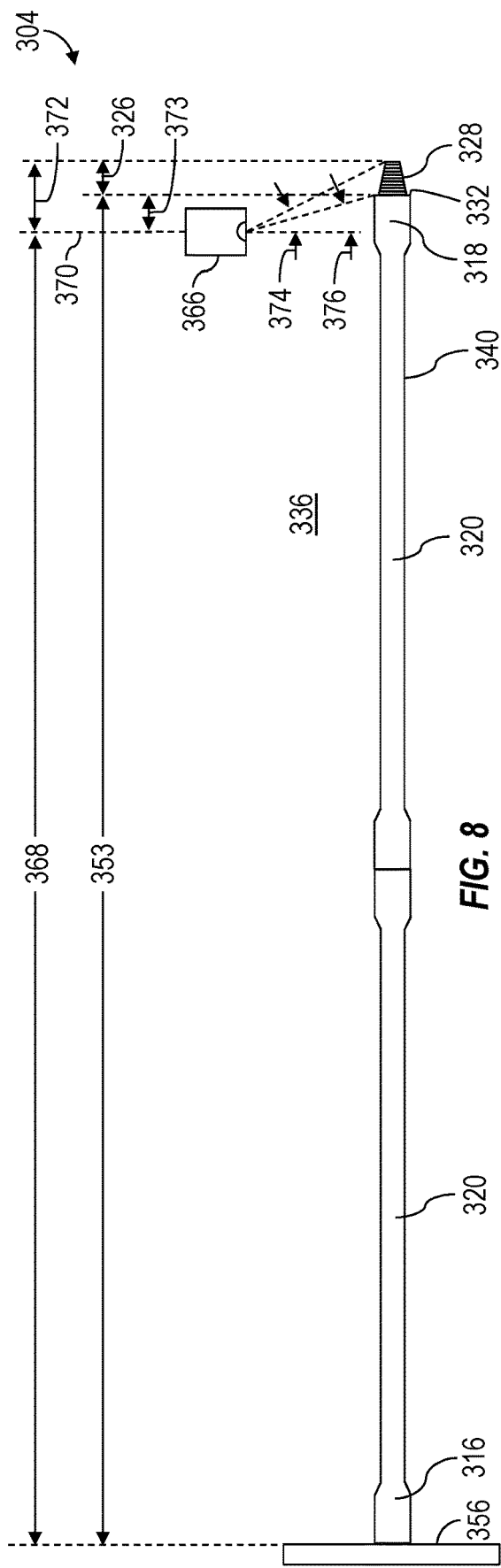

TUBULAR MEASUREMENT

CROSS-REFERENCE TO RELATED APPLICATIONS

This application claims priority to and the benefit of U.S. Provisional Application No. 62/287,097, titled "Drill Pipe Length Measurement System," filed Jan. 26, 2016, the entire disclosure of which is hereby incorporated herein by reference.

This application also claims priority to and the benefit of U.S. Provisional Application No. 62/341,522, titled "Image Based System for Drilling Operations," filed May 25, 2016, the entire disclosure of which is hereby incorporated herein by reference.

BACKGROUND OF THE DISCLOSURE

Wells are generally drilled into the ground or ocean bed to recover natural deposits of oil, gas, and other natural resources that are trapped in subsurface rock formations. Such wells are drilled using a drill bit attached to the lower end of a drill string. Drilling fluid is pumped from the wellsite surface down through the drill string to the drill bit. The drilling fluid lubricates and cools the bit, and may additionally carry drill cuttings from the wellbore back to the surface.

Length of the drill string may be tracked for several reasons. Operational safety, for example, may be enhanced by monitoring the length of the drill string. Further, the well plan for the well may be at least partially mapped out according to well depth, and the string length may serve as a proxy or partial basis for tracking well depth.

To track the length of the drill string, each new length (e.g., a stand of one or more, e.g., up to three) of drill pipe may be measured and added to the length of the drill string that was previously ran into the well. Such measurements are generally done manually, such as by using a measuring tool like a measuring tape to measure the 10-30 feet of drill pipe added by the new length. The margin of error using such process is relatively wide, however, even when measurements are carefully taken. For example, the margin of error might be about 1% or more. While such a margin of error may translate into a mere few inches, when such errors are multiplied potentially hundreds of times for a well that extends 10,000 feet or more, the cumulative error becomes an impediment to tracking the length of the drill string.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including measuring a first distance between a first point and a second point, positioning a first end of a downhole tool in alignment with the first point, measuring a second distance between the second point and a second end of the downhole tool, and determining length of the downhole tool based on the first and second distances.

The present disclosure also introduces an apparatus including a tubular measuring system. The tubular measuring system includes a sensor disposed at a predetermined location with respect to a datum. The sensor is operable to generate a signal indicative of a tubular feature position relative to the sensor. The tubular measuring system also includes a processing device comprising a processor and a memory storing computer program code. The processing device is operable to receive and process the signal to determine position of the tubular feature with respect to the datum.

The present disclosure also introduces an apparatus including a measuring system operable to determine length of a tubular. The measuring system includes a first contact member positionally fixed at a first distance from a datum and configured to contact a first end of the tubular. The measuring system also includes a second contact member configured to move toward the first contact member to contact a second end of the tubular. The measuring system also includes a sensor operable to generate a signal indicative of a second distance between the datum and the second contact member when the first contact member is in contact with the first end of the tubular and the second contact member is in contact with the second end of the tubular. The measuring system also includes a processing device operable to determine the length of the tubular based on the first distance and the signal.

The present disclosure also introduces a method including transferring a tubular via tubular handling equipment disposed at an oil and/or gas drilling wellsite, and operating a sensor located at a predetermined location, relative to a datum at the wellsite, to generate a signal dependent upon a first characteristic of a feature of the tubular. The first characteristic is a dimension or position of the tubular feature relative to the predetermined sensor location. The method also includes operating a processing device comprising a processor and a memory storing computer program code to determine a second characteristic based on the signal. The second characteristic is a dimension of the tubular or the tubular feature or a position of the tubular or the tubular feature relative to the datum.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 7 is a schematic view of at least a portion of an example implementation of apparatus according to one or more aspects of the present disclosure.

FIG. 8 is a schematic view of at least a portion of an example implementation of apparatus according to one or more aspects of the present disclosure.

DETAILED DESCRIPTION

Figure 1:
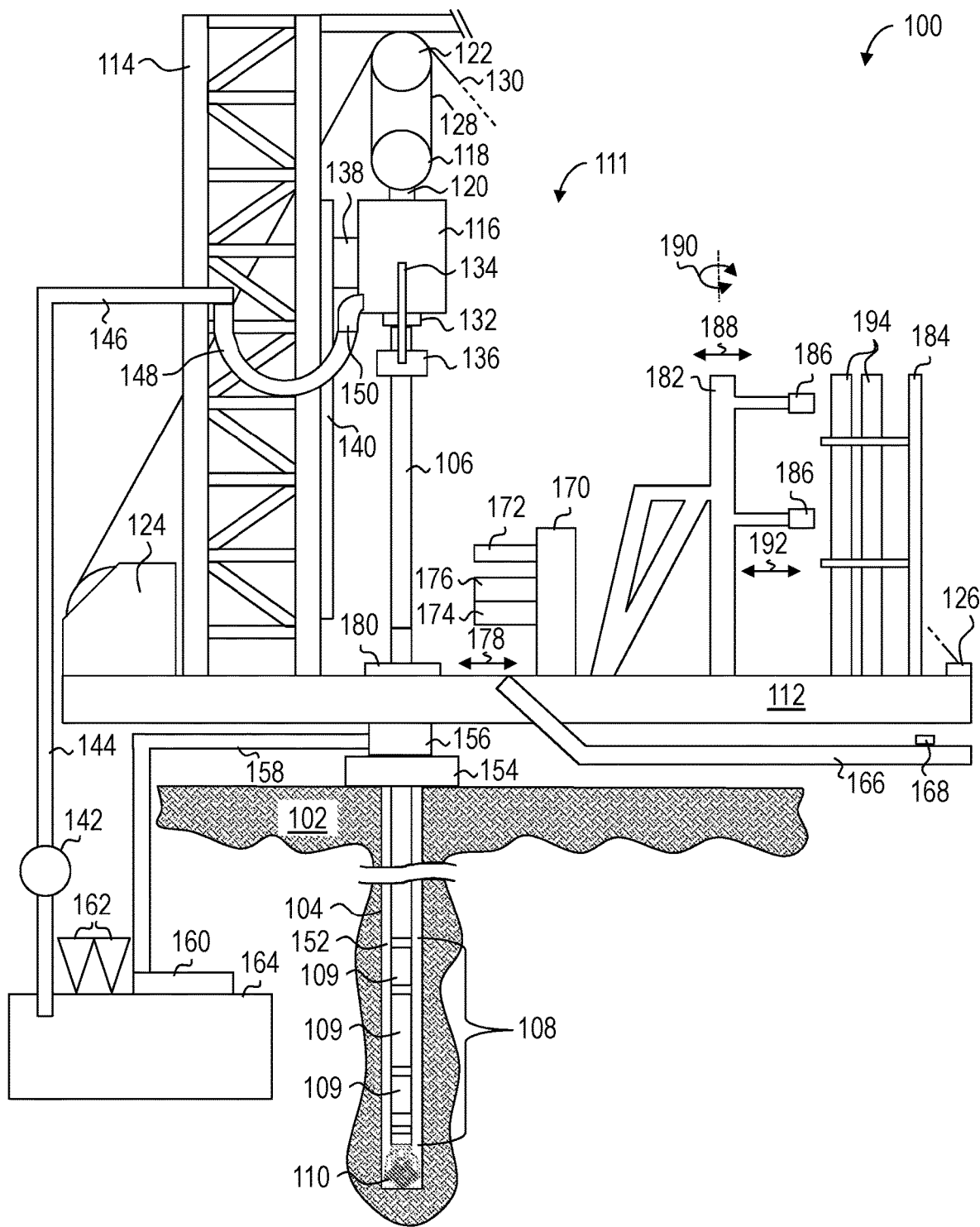
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example implementation of a drilling system 100 operable to drill a wellbore 104 into one or more subsurface formations 102 in accordance with one or more aspects of the present disclosure, to which one or more aspects of the present disclosure may be applicable. A drill string 106 penetrates the wellbore 104 and may include a bottom hole assembly (BHA) 108 that comprises or is mechanically coupled to a drill bit 110. The BHA 108 may comprise various downhole tools 109, such as for measuring, processing, and storing information. A telemetry device may be in the BHA 108 to facilitate communications with a control system 200 (shown in FIGS. 2 and 3) of the drilling system 100. The BHA 108 may have a modular construction with specific downhole tools 109 in certain modules. However, the BHA 108 may be unitary or select downhole tools 109 may be modular. The downhole tools 109 or modules may be positioned in a variety of configurations throughout the BHA 108. The BHA 108 may comprise a measuring while drilling (MWD) downhole tool or module, such as may include tools operable to measure wellbore trajectory, wellbore temperature, wellbore pressure, and/or other example properties. The BHA 108 may comprise a sampling while drilling (SWD) system comprising a sample downhole tool or module for communicating a formation fluid through the BHA 108 and obtaining a sample of the formation fluid. The SWD system may comprise gauges, sensor, monitors and/or other devices that may also be utilized for downhole sampling and/or testing of a formation fluid. The BHA 108 may comprise a logging while drilling (LWD) downhole tool or module that may include tools operable to measure formation parameters and/or fluid properties, such as resistivity, porosity, permeability, sonic velocity, optical density, pressure, temperature, and/or other example properties.

The drilling system 100 may include a drill rig 111 above the surface of the formation 102. The drill rig 111 may comprise a mast 114 (at least a portion of which is depicted in FIG. 1) extending from a rig floor 112 that is positioned over the wellbore 104. A top drive 116 may be suspended from the mast 114 and mechanically coupled to the drill string 106. The top drive 116 provides a rotational force (e.g., torque) to drive rotational movement of the drill string 106, which may advance the drill string 106 into the formation 104 and form the wellbore 104.

The top drive 116 may be suspended from the mast 114 utilizing hoisting equipment. The hoisting equipment may include a traveling block 118 with a hook 120, a crown block 122, a drawworks 124, a deadline anchor 126, a supply reel (not shown), and a drill line 128 with a deadline 130 (a portion of which is shown in phantom lines). The hook 120 of the traveling block 118 may mechanically couple the top drive 116. The crown block 122 may be suspended from and supported by the mast 114. The drawworks 124 and the deadline anchor 126 may be on and supported by the rig floor 112. The drill line 128 may be supplied from the supply reel through the deadline anchor 126. The drill line 128 may be wrapped around and clamped at the deadline anchor 126 such that the drill line 128 that extends from the deadline anchor 126 to the crown block 122 is stationary during normal drilling operations, and hence, the portion of the drill line 128 that extends from the deadline anchor 126 to the crown block 122 is referred to as the deadline 130. The crown block 122 and traveling block 118 may comprise one or more pulleys or sheaves. The drill line 128 may be reeved around the pulleys or sheaves of the crown block 122 and the traveling block 118. The drill line 128 may extend from the crown block 122 to the drawworks 124. The drawworks 124 may comprise a drum, a prime mover (e.g., an engine or motor), a control system, and one or more brakes, such as a mechanical brake (e.g., a disk brake), an electrodynamic brake, and/or the like. The prime mover of the drawworks 124 may drive the drum to rotate and reel in the drill line 128, which in turn may cause the traveling block 118 and top drive 116 to move upward. The drawworks 124 may release the drill line 128 by a controlled rotation of the drum utilizing the prime mover and control system, and/or by disengaging the prime mover (such as with a clutch) and disengaging and/or operating one or more brakes to control the release of the drill line 128. By releasing drill line 128 from the drawworks 124, the traveling block 118 and top drive 116 may move downward. If the drilling system 100 is an off-shore system, the hoisting equipment may also include a motion or heave compensator between the mast 114 and the crown block 122 and/or between the traveling block 118 and the hook 120, for example.

The top drive 116 may be suspended by the hook 120 and include a prime mover (not shown) with a drive shaft 132, a grabber (not shown), a swivel (not shown), and a tubular handling assembly 134 terminating with an elevator 136. The drill string 106 may be mechanically coupled to the drive shaft 132 (e.g., with or without a sub saver between the drill string 106 and the drive shaft 132). The prime mover may drive the drive shaft 132, such as through a gear box or transmission, to rotate the drive shaft 132 and, therefore, the drill string 106, which, when working in conjunction with operation of the drawworks 124, may advance the drill string 106 into the formation and form the wellbore 104. The tubular handling assembly 134 and elevator 136 may permit the top drive 116 to handle tubulars, e.g., drill pipes, drill collars, casing joints, and the like, that are not mechanically coupled to the drive shaft 132, for example. For example, when the drill string 106 is being tripped into or out of the wellbore 104, the elevator 136 may grasp onto the tubulars of the drill string 106 such that the tubulars may be raised and/or lowered utilizing the hoisting equipment mechanically coupled to the top drive 116. The grabber may include a clamp that clamps onto a tubular when making up and/or breaking out a connection of a tubular with the drive shaft 132. The top drive 116 may have a guide system 138, such as rollers, that track up and down a guide rail 140 on the mast 114. The guide system 138 and guide rail 140 may aid in keeping the top drive 116 aligned with the wellbore 104 and in preventing the top drive 116 from rotating during drilling by transferring the reactive torque from the drill string 106 to the mast 114.

The drill rig 111 may further include a drilling fluid circulation system operable to circulate drilling fluid (e.g., mud) to the drill bit 110 during drilling operations. A pump 142 may deliver the drilling fluid through a discharge line 144, stand pipe 146, rotary hose 148, and a gooseneck 150 to the swivel of the top drive 116. The swivel may conduct the drilling fluid through the tubulars of the drill string 106, and the drilling fluid may exit the drill string 106 via ports in the drill bit 110. The drilling fluid may then circulate upward through the annulus 152 defined between the outside of the drill string 106 and the wall of the wellbore 104. In this manner, the drilling fluid may lubricate the drill bit 110 and carry formation cuttings up to the surface as the drilling fluid is circulated. At the surface, the drilling fluid may flow through a blowout preventer 154 and a bell nipple 156 that diverts the drilling fluid to a return flowline 158. The return flowline 158 may direct the drilling fluid to a shale shaker 160 that removes large formation cuttings from the drilling fluid. The drilling fluid may be then directed to reconditioning equipment 162. Reconditioning equipment 162 may remove gas and/or finer formation cuttings from the drilling fluid. The reconditioning equipment 162 may include a desilter, a desander, a degasser, and/or the like. After being treated by the reconditioning equipment 162 and/or between being treated by various ones of the reconditioning equipment 162, the drilling fluid may be conveyed to a mud tank 164. In some examples, intermediate mud tanks may be utilized to hold drilling fluid between the shale shaker 160 and various ones of the reconditioning equipment 162. The mud tank 164 may include an agitator to maintain uniformity of the drilling fluid contained in the mud tank 164. The pump 142 may then recirculate the drilling fluid from the mud tank 164. A hopper (not shown) may be disposed in a flowline between the mud tank 164 and the pump 142 to disperse an additive, such as caustic soda, in the drilling fluid.

The drill rig 111 may further include other tubular handling equipment operable to move tubulars, including drill pipe, during drilling operations. For example, a catwalk 166 may be utilized to convey tubulars from a ground level to the rig floor 112. The catwalk 166 may have a horizontal portion and an inclined portion that extends between the horizontal portion and the rig floor 112. A skate 168 may be positioned in a groove in the horizontal and inclined portions of the catwalk 166. The skate 168 may be driven along the groove by a rope and pulley system, for example. Additionally, one or more racks (not shown) may adjoin the horizontal portion of the catwalk 166, and the racks may have a spinner unit for transferring tubulars to the groove of the catwalk 166.

An iron roughneck 170 may be positioned on the rig floor 112. The iron roughneck 170 may comprise a spinning system 172 and a torque wrench comprising a lower tong 174 and an upper tong 176. The iron roughneck 170 may be moveable (e.g., in a translation movement as indicated by arrow 178) to approach the drill string 106 (e.g., for making up and/or breaking out a connection of the drill string 106) and to move clear of the drill string 106. The spinning system 172 may be generally utilized to apply low torque spinning to make up and/or break out a threaded connection between tubulars of the drill string 106. The torque wrench applies a higher torque to make up and/or break out the threaded connection.

A reciprocating slip system 180 may be located on and/or in the rig floor 112 such that the drill string 106 extends through the reciprocating slip 180. The reciprocating slip 180 may be in an open position to permit advancement of the drill string 106 through the reciprocating slip 180, and the reciprocating slip 180 may be in a closed position to clamp the drill string 106 to prevent advancement of the drill string 106. In a closed position, the reciprocating slip 180 may suspend the drill string 106 in the wellbore 104.

In operation, the hoisting equipment may lower the drill string 106 while the top drive 116 rotates the drill string 106 to advance the drill string 106 downward in the wellbore 104. During the advancement of the drill string 106, the reciprocating slip 180 is in an open position, and the iron roughneck 170 is clear of the drill string 106. When the upper portion of the tubular in the drill string 106 that is made up to the top drive 116 is near to the reciprocating slip 180 and/or rig floor 112, the top drive 116 ceases rotating the drill string 106, and the reciprocating slip 180 closes to clamp the drill string 106. The grabber of the top drive 116 clamps the upper portion of the tubular made up to the drive shaft 132. Once clamped, the drive shaft 132 is driven by the prime mover of the top drive 116 and transmission or gearbox in a direction reverse from the drilling rotation to break out the connection between the drive shaft 132 and the drill string 106. The grabber of the top drive 116 may then release the tubular of the drill string 106.

Multiple tubulars may be loaded on the rack of the catwalk 166 and individual tubulars may be transferred from the rack to the groove in the catwalk 166, such as by the spinner unit. A tubular positioned in the groove may be conveyed along the groove by the skate 168 as driven, e.g., by a rope and pulley system. As the tubular is conveyed (e.g., pushed) along the groove by the skate 168, an end of the tubular may reach the inclined portion of the catwalk 166 and be conveyed along the incline to the rig floor 112. After the tubular is conveyed such that the end of the tubular projects above the rig floor 112, the elevator 136 may be able to grasp around the end of the tubular permitting the drawworks 124 to lift the tubular via the top drive 116.

With the connection between the drill string 106 and the drive shaft 132 broken out and with the elevator 136 grasping the tubular, the hoisting equipment may raise the elevator 136, e.g., the drawworks 124 reels in the drill line 128 to raise the traveling block 118, and hence, the top drive 116 and the elevator 136 with the tubular. The tubular suspended by the elevator 136 may be aligned with the upper portion of the drill string 106. The iron roughneck 170 may be moved toward the drill string 106 as indicated by arrow 178, and the lower tong 174 may clamp onto the upper portion of the drill string 106. The spinning system 172 may then rotate the suspended tubular (e.g., a threaded male connector) into the upper portion of the drill string 106 (e.g., a threaded female connector). Once the spinning system 172 has provided the low torque rotation to make up the connection between the suspended tubular and the upper portion of the drill string 106, the upper tong 176 may clamp onto the suspended tubular and rotate the suspended tubular with a high torque to complete making up the connection between the suspended tubular and the drill string 106. In this manner, the suspended tubular becomes a part of the drill string 106. The iron roughneck 170 may then release the drill string 106 and move clear of the drill string 106 as indicated by arrow 178.

The grabber of the top drive 116 may then clamp onto the drill string 106. The drive shaft 132 (e.g., a threaded male connector) may be brought into contact with the drill string 106 (e.g., a threaded female connector) and rotated by the prime mover to make up a connection between the drill string 106 and the drive shaft 132. The grabber may then release the drill string 106, and the reciprocating slip 180 may be operated into the open position. Drilling may then resume.

The tubular handling equipment by further include a tubular handling manipulator (PHM) 182 disposed in association with a fingerboard 184. Although the PHM 182 and the fingerboard 184 are shown supported on the rig floor 112, it is to be understood that one or both of the PHM 182 and a fingerboard 184 may be located off of the rig floor 112. The fingerboard 184 provides storage (e.g., temporary storage) of tubulars 194 during various operations, such as during and between tripping out and tripping in the drill string 106. The PHM 182 may be operable to transfer tubulars between the drill string 106 and the fingerboard 184. The PHM 182 may include arms and clamps 186, such as may be operable to grasp and/or clamp onto a tubular while the PHM 182 transfers the tubular. The PHM 182 may be movable in one or more translation direction 188 and/or a rotational direction 190 around an axis of the PHM 182. The arms of the PHM 182 may extend and retract along direction 192.

To trip out the drill string 106, the hoisting equipment may raise the top drive 116, the reciprocating slip 180 may close to clamp the drill string 106, and the elevator 136 may close around the drill string 106. The grabber of the top drive 116 may then clamp the upper portion of the tubular made up to the drive shaft 132. Once clamped, the drive shaft 132 may be driven by the prime mover and transmission or gearbox of the top drive 116 in a direction reverse from the drilling rotation to break out the connection between the drive shaft 132 and the drill string 106. The grabber of the top drive 116 may then release the tubular of the drill string 106, and the drill string 106 may be suspended, at least in part, by the elevator 136. The iron roughneck 170 may be moved 178 toward the drill string 106. The lower tong 174 may clamp onto a lower tubular at a connection of the drill string 106, and the upper tong 176 may clamp onto an upper tubular at the connection of the drill string 106. The upper tong 176 may then rotate the upper tubular to provide a high torque to break out the connection between the upper and lower tubulars. Once the high torque has been provided, the spinning system 172 may rotate the upper tubular to break out the connection, and the upper tubular may be suspended above the rig floor 112 by the elevator 136. The iron roughneck 170 may then release the drill string 106 and move clear of the drill string 106.

The PHM 182 may then move (e.g., with movement along directions indicated by arrows 188, 190, and/or 192) to grasp with the clamps 186 the tubular suspended from the elevator 136. Once the clamps 186 have grasped the suspended tubular, the elevator 136 may open to release the tubular. The PHM 182 may then move (e.g., with movement along directions indicated by arrows 188, 190, and/or 192) while grasping the tubular with the clamps 186, place the tubular in the fingerboard 184, and release the tubular to store the tubular in the fingerboard 184.

Once the tubular that was suspended by the elevator 136 is clear from the top drive 116, the top drive 116 may be lowered and the elevator 136 may be closed around and grasps the upper portion of the drill string 106 projecting above the reciprocating slip 180 and/or rig floor 112. The reciprocating slip 180 may then be opened and the elevator 136 raised utilizing the hoisting equipment to raise the drill string 106. Once raised, the reciprocating slip 180 may close to clamp the drill string 106. The iron roughneck 170 may move to the drill string 106 and break out a connection between tubulars, as described above. The PHM 182 may then grasp the suspended tubular and place the tubular in the fingerboard 184, as described above. This process may be repeated until a full length of the drill string 106 is removed from the wellbore 104.

To trip in the drill string 106, the process described above for tripping out the drill string 106 may be reversed. To summarize, the PHM 182 may grasp a tubular (e.g., tubular 194) from the fingerboard 184 and transfer the tubular to the elevator 136 that closes around and grasps the tubular. If no portion of the drill string 106 has been advanced into the wellbore 104, the suspended tubular may be advanced into the wellbore 104 by lowering the elevator 136. If a portion of the drill string 106 has been advanced into the wellbore 104, the drill string 106 may be projecting above the reciprocating slip 180 and/or rig floor 112, and the reciprocating slip 180 may be in a closed position clamping the drill string 106. The iron roughneck 170 may then move to the drill string 106 and make up a connection between the drill string 106 and the suspended tubular, as described above. The reciprocating slip 180 may then open and the elevator 136 may be lowered to advance the drill string 106 into the wellbore 104. Once the drill string 106 has been advanced into the wellbore 104 such that the upper portion of the drill string 106 is near to the reciprocating slip 180, the reciprocating slip 180 may be closed to clamp the drill string 106, and the elevator 136 may be opened to release the drill string 106. The process may be repeated until the drill string 106 is advanced into the wellbore 104 such that the drill bit 110 contacts the bottom of the wellbore 104. The grabber of the top drive 116 may clamp the upper tubular of the drill string 106, and the drive shaft 132 may be driven to make up a connection with the drill string 106. The grabber may release the tubular, and drilling may resume.

A person of ordinary skill in the art will readily understand that a drilling system may include more or fewer components than what was described above and depicted in FIG. 1. Additionally, various components and/or systems of the drilling system 100 in FIG. 1 may include more or fewer components. For example, various engines, motors, hydraulics, actuators, valves, or the like that were not described with respect to or depicted in FIG. 1 may be included in different components and/or systems; however, such components are within the scope of the present disclosure.

Figure 2:
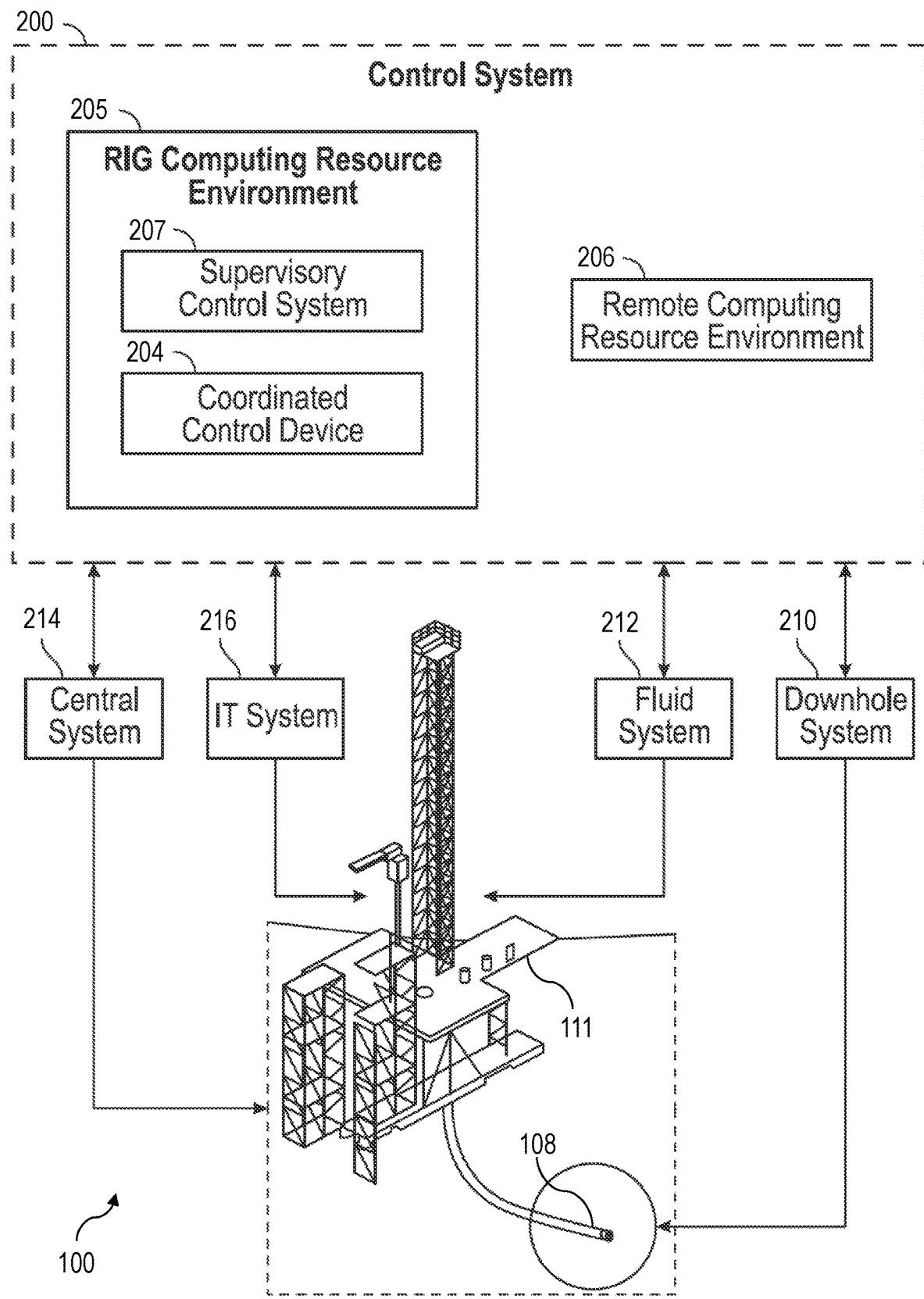
FIG. 2 is a schematic view of at least a portion of an example implementation of apparatus according to one or more aspects of the present disclosure.

FIG. 2 is a schematic view of at least a portion of an example implementation of a control system 200 for the drilling system 100 according to one or more aspects of the present disclosure. The control system 200 may include a rig computing resource environment 205, which may be located onsite at the drilling rig 111. The rig computing resource environment 205 may include a coordinated control device 204 and/or a supervisory control system 207. The control system 200 may include a remote computing resource environment 206, which may be located offsite from the drilling rig 111. The remote computing resource environment 206 may include computing resources locating offsite from the drilling rig 111 and accessible over a network. A "cloud" computing environment is one example of a remote computing resource. The cloud computing environment may communicate with the rig computing resource environment 205 via a network connection (e.g., a WAN or LAN connection).

Further, the drilling rig 111 may include various systems with different sensors and equipment for performing operations of the drilling rig 111, and may be monitored and controlled via the control system 200, e.g., the rig computing resource environment 205. Additionally, the rig computing resource environment 205 may provide for secured access to rig data to facilitate onsite and offsite user devices monitoring the rig, sending control processes to the rig, and the like.

The various systems of the drilling rig 111 may include a downhole system 210, a fluid system 212, and a central system 214. The drilling rig 111 may also include an information technology (IT) system 216. The downhole system 210 may include, for example, a BHA, mud motors, sensors, among other examples, disposed along the drill string, and/or other drilling equipment configured to be deployed into the wellbore. Accordingly, the downhole system 210 may refer to tools disposed in the wellbore as part of the drill string utilized to drill the well. The fluid system 212 may include, for example, drilling mud, pumps, valves, cement, mud-loading equipment, mud-management equipment, pressure-management equipment, separators, and other fluids equipment. Accordingly, the fluid system 212 may perform fluid operations of the drilling rig 111. The central system 214 may include a hoisting and rotating platform, top drives, rotary tables, kellys, drawworks, pumps, generators, drill pipe handling equipment, derricks, masts, substructures, and other suitable equipment. Accordingly, the central system 214 may perform power generation and drill pipe handling, hoisting, and rotation operations. The central system 214 may also serve as a support platform for drilling equipment and staging ground for rig operation, such as connection make up operations, among other examples. The IT system 216 may include software, computers, and other IT equipment for implementing IT operations of the drilling rig 111.

The control system 200, via the coordinated control device 204 of the rig computing resource environment 205, may be operable to monitor various sensors of the multiple systems 210, 212, 214, 216 of the drilling rig 111 and provide control commands to such systems 210, 212, 214, 216, such that sensor data generated by the various sensors may be utilized to provide control commands to the systems 210, 212, 214, 216 and other systems of the drilling rig 111. Data may be generated by both sensors and computation, which may be utilized for coordinated control, such as for depth control. For example, the control system 200 may collect temporally and depth aligned surface data and downhole data from the drilling rig 111, and store the collected data for access onsite at the drilling rig 111 or offsite via the rig computing resource environment 205. Thus, the control system 200 may provide monitoring capability. Additionally, the control system 200 may include supervisory control via the supervisory control system 207.

One or more of the downhole system 210, the fluid system 212, and/or the central system 214 may be manufactured and/or operated by different vendors. Hence, certain systems may not be capable of unified control (e.g., due to different protocols, restrictions on control permissions, etc.). A control system 200 that is unified, may, however, provide control over the drilling rig 111 and its various systems, including the downhole system 210, fluid system 212, and/or central system 214.

Figure 3:
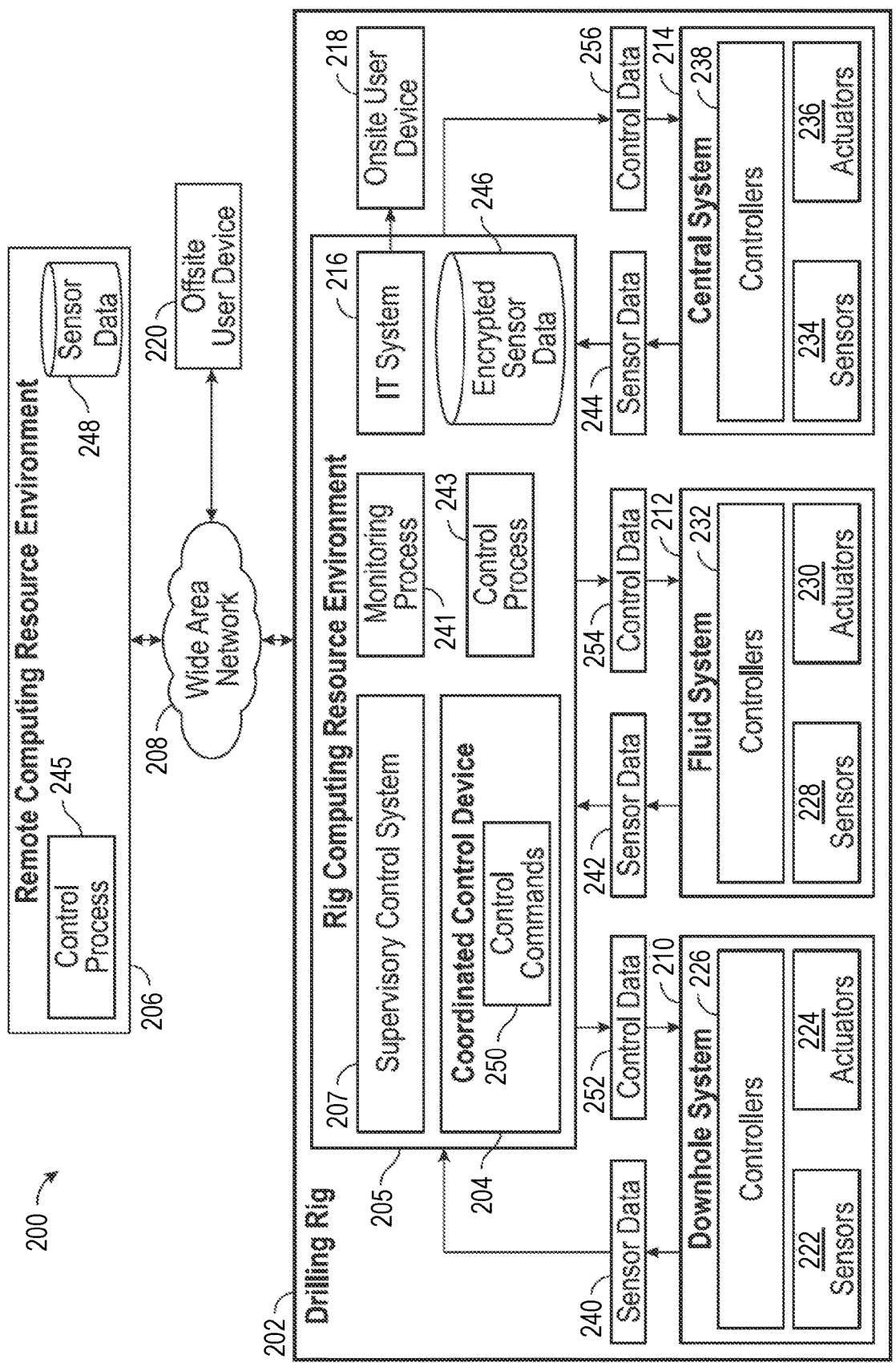
FIG. 3 is a schematic view of at least a portion of an example implementation of apparatus according to one or more aspects of the present disclosure.

FIG. 3 is a schematic view of an example implementation of the control system 200 shown in FIG. 2 according to one or more aspects of the present disclosure. The rig computing resource environment 205 may be operable to communicate with offsite devices and systems utilizing a network 208 (e.g., a wide area network (WAN) such as the internet). The rig computing resource environment 205 may be further operable to communicate with the remote computing resource environment 206 via the network 208. FIG. 3 also shows the aforementioned systems of the drilling rig 111, such as the downhole system 210, the fluid system 212, the central system 214, and the IT system 216. An example implementation of the drilling rig 111 may include one or more onsite user devices 218, such as may be communicatively connected or otherwise interact with the IT system 216. The onsite user devices 218 may be or comprise stationary user devices intended to be stationed at the drilling rig 111 and/or portable user devices. For example, the onsite user devices 218 may include a desktop, a laptop, a smartphone, a personal data assistant (PDA), a tablet component, a wearable computer, or other suitable devices. The onsite user devices 218 may be operable to communicate with the rig computing resource environment 205 of the drilling rig 111 and/or the remote computing resource environment 206.

The control system 200 may further include one or more offsite user devices 220. The offsite user devices 220 may be or comprise a desktop, a laptop, a smartphone, a personal data assistant (PDA), a tablet component, a wearable computer, or other suitable devices. The offsite user devices 220 may be operable to receive and/or transmit information (e.g., monitoring functionality) from and/or to the drilling rig 111 via communication with the rig computing resource environment 205. The offsite user devices 220 may provide control processes for controlling operation of the various systems 210, 212, 214, 216 of the drilling rig 111. The offsite user devices 220 may be operable to communicate with the remote computing resource environment 206 via the network 208.

Figure 11:
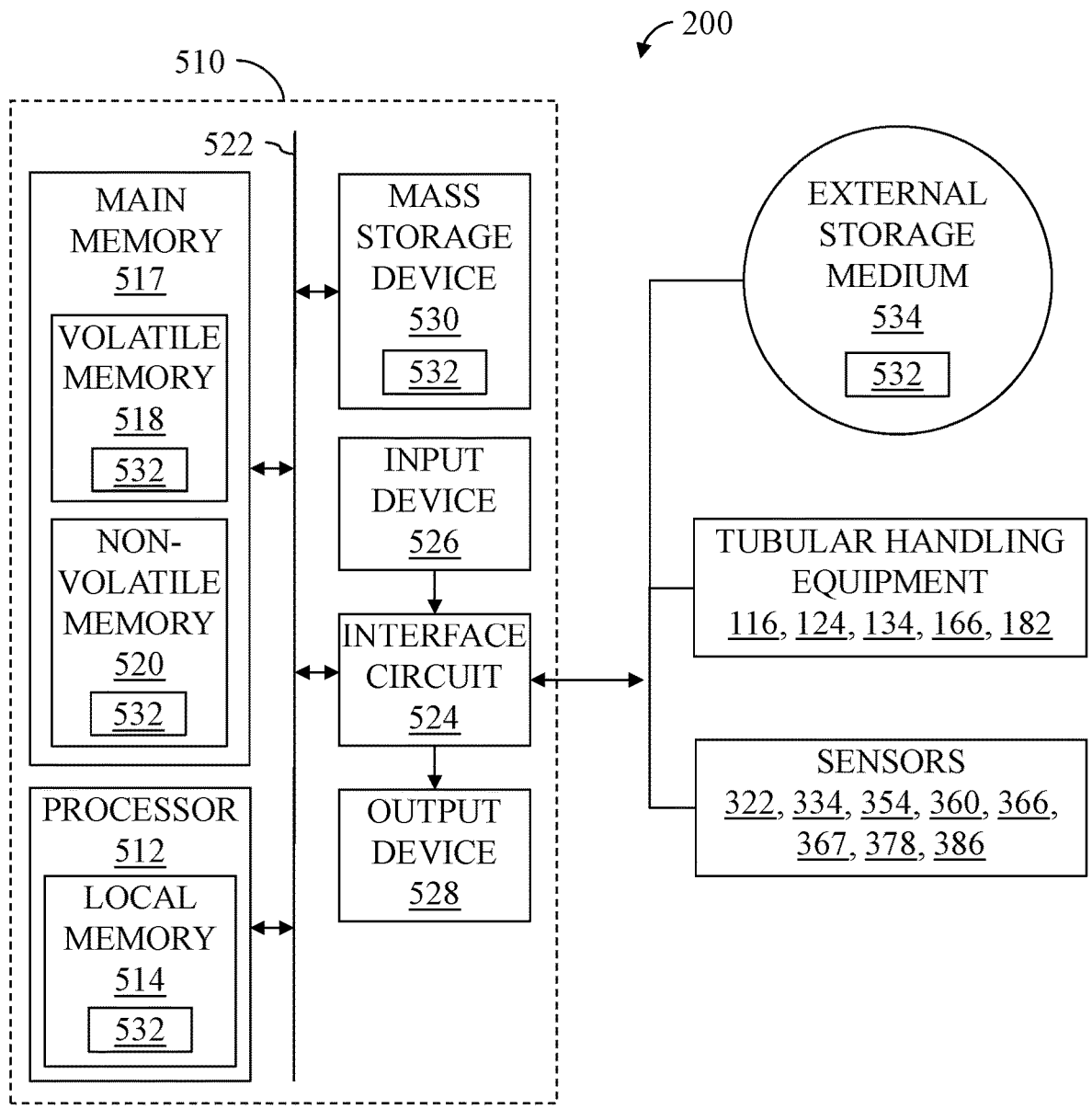
FIG. 11 is a schematic view of at least a portion of an example implementation of apparatus according to one or more aspects of the present disclosure.

The systems 210, 212, 214, 216 of the drilling rig 111 may include various sensors, actuators, and controllers (e.g., programmable logic controllers (PLCs)), such as the processing device 510 shown in FIG. 11. The downhole system 210 may include sensors 222, actuators 224, and controllers 226, the fluid system 212 may include sensors 228, actuators 230, and controllers 232, and the central system 214 may include sensors 234, actuators 236, and controllers 238. The sensors 222, 228, 234 may include suitable sensors for operation of the drilling rig 111. For example, the sensors 222, 228, 234 may include cameras, position sensors, pressure sensors, temperature sensors, flow rate sensors, vibration sensors, current sensors, voltage sensors, resistance sensors, gesture detection sensors or devices, voice actuated or recognition devices or sensors, among other examples.

The sensors 222, 228, 234 may be operable to provide sensor data to the rig computing resource environment 205 (e.g., to the coordinated control device 204). For example, downhole system sensors 222 may provide sensor data 240, the fluid system sensors 228 may provide sensor data 242, and the central system sensors 234 may provide sensor data 244. The sensor data 240, 242, 244 may include, for example, signals or information indicative of equipment operation status (e.g., on or off, up or down, set or release, etc.), drilling parameters (e.g., depth, hook load, torque, etc.), auxiliary parameters (e.g., vibration data of a pump), among other examples. The acquired sensor data 240, 242, 244 may include or be associated with a timestamp (e.g., date and/or time) indicative of when the sensor data was acquired. Further, the sensor data 240, 242, 244 may be aligned with a depth or other drilling parameter.

Acquiring the sensor data 240, 242, 244 at the coordinated control device 204 may facilitate measurement of the same physical properties at different locations of the drilling rig 111, wherein the sensor data 240, 242, 244 may be utilized for measurement redundancy to permit continued wellsite operations. Measurements of the same physical properties at different locations may also be utilized for detecting equipment conditions among different physical locations at the wellsite surface or within the wellbore. Variation in measurements at different wellsite locations over time may be utilized to determine equipment performance, system performance, scheduled maintenance due dates, and the like. For example, slip status (e.g., in or out) may be acquired from the sensors and communicated to the rig computing resource environment 205. In another example implementation, acquisition of fluid samples may be measured by a sensor and related with bit depth and time measured by other sensors. Acquisition of data from a camera sensor may facilitate detection of arrival and/or installation of materials or equipment at the drilling rig 111. The time of arrival and/or installation of materials or equipment may be utilized to evaluate degradation of material, scheduled maintenance of equipment, and other evaluations.

The coordinated control device 204 may facilitate control of individual systems (e.g., the central system 214, the downhole system, or fluid system 212) at the level of each individual system. For example, in the fluid system 212, sensor data 228 may be fed into the controller 232, which may respond to control the actuators 230. However, for control operations that involve multiple systems, the control may be coordinated through the coordinated control device 204. For example, coordinated control operations may include the control of downhole pressure during tripping. The downhole pressure may be affected by both the fluid system 212 (e.g., pump rate and choke position) and the central system 214 (e.g. tripping speed). Thus, when it is intended to maintain certain downhole pressure during tripping, the coordinated control device 204 may be utilized to direct the appropriate control commands.

Control of the various systems 210, 212, 214 of the drilling rig 111 may be provided via a three-tier control system that includes a first tier of the controllers 226, 232, 238, a second tier of the coordinated control device 204, and a third tier of the supervisory control system 207. Coordinated control may also be provided by one or more controllers 226, 232, 238 of one or more of the drilling rig systems 210, 212, 214 without the use of a coordinated control device 204. In such implementations of the control system 200, the rig computing resource environment 205 may provide control processes directly to these controllers 226, 232, 238 for coordinated control.

The sensor data 240, 242, 244 may be received by the coordinated control device 204 and utilized for control of the drilling rig 111 and the drilling rig systems 210, 212, 214. The sensor data 240, 242, 244 may be encrypted to produce encrypted sensor data 246. For example, in some embodiments, the rig computing resource environment 205 may encrypt sensor data from different types of sensors and systems to produce a set of encrypted sensor data 246. Thus, the encrypted sensor data 246 may not be viewable by unauthorized user devices (either offsite user device 220 or onsite user device 218) if such devices gain access to one or more networks of the drilling rig 111. The encrypted sensor data 246 may include a timestamp and an aligned drilling parameter (e.g., depth) as described above. The encrypted sensor data 246 may be communicated to the remote computing resource environment 206 via the network 208 and stored as encrypted sensor data 248.

The rig computing resource environment 205 may provide the encrypted sensor data 248 available for viewing and processing offsite, such as via the offsite user devices 220. Access to the encrypted sensor data 248 may be restricted via access control implemented in the rig computing resource environment 205. The encrypted sensor data 248 may be provided in real-time to offsite user devices 220 such that offsite personnel may view real-time status of the drilling rig 111 and provide feedback based on the real-time sensor data. For example, different portions of the encrypted sensor data 246 may be sent to the offsite user devices 220. The encrypted sensor data 246 may be decrypted by the rig computing resource environment 205 before transmission or decrypted on the offsite user device 220 after encrypted sensor data is received.

The offsite user device 220 may include a thin client (not shown) configured to display data received from the rig computing resource environment 205 and/or the remote computing resource environment 206. For example, multiple types of thin clients (e.g., devices with display capability and minimal processing capability) may be utilized for certain functions or for viewing various sensor data 240, 242, 244.

The rig computing resource environment 205 may include various computing resources utilized for monitoring and controlling operations such as one or more computers having a processor and a memory. For example, the coordinated control device 204 may include a processing device, such as the processing device 510 shown in FIG. 11, having a processor and memory for processing sensor data, storing sensor data, and issuing control commands responsive to sensor data. As described above, the coordinated control device 204 may control various operations of the various systems 210, 212, 214 of the drilling rig 111 via analysis of sensor data 240, 242, 244 from one or more drilling rig systems 210, 212, 214 to facilitate coordinated control between each of these systems 210, 212, 214. The coordinated control device 204 may execute control commands 250 (e.g., coded instructions) for control of the various systems of the drilling rig 111 (e.g., drilling rig systems 210, 212, 214). The coordinated control device 204 may send control signals or data determined by the execution of the control commands 250 to one or more systems of the drilling rig 111. For example, control data 252 may be sent to the downhole system 210, control data 254 may be sent to the fluid system 212, and control data 254 may be sent to the central system 214. The control data may include, for example, human operator commands (e.g., turn on or off a pump, switch on or off a valve, update a physical property set-point, etc.). The coordinated control device 204 may include a fast control loop that directly obtains sensor data 240, 242, 244 and executes, for example, a control algorithm. The coordinated control device 204 may include a slow control loop that obtains data via the rig computing resource environment 205 to generate control commands.

The coordinated control device 204 may intermediate between the supervisory control system 207 and the controllers 226, 232, 238 of the systems 210, 212, 214, such as may permit the supervisory control system 207 to control the systems of the drilling rig 111. The supervisory control system 207 may include, for example, devices for entering control commands to perform operations of systems of the drilling rig 111. The coordinated control device 204 may receive commands from the supervisory control system 207, process such commands according to a rule (e.g., an algorithm based upon the laws of physics for drilling operations), and provide control data to one or more systems of the drilling rig 111. The supervisory control system 207 may be provided by and/or controlled by a third party. In such implementations, the coordinated control device 204 may coordinate control between discrete supervisory control systems and the systems 210, 212, 214 while utilizing control commands that may be generated based on the sensor data received from the systems 210 212, 214 and analyzed via the rig computing resource environment 205.

The rig computing resource environment 205 may include a monitoring process 241 that may utilize sensor data 240, 242, 244 to determine information about the drilling rig 111. For example, the monitoring process 241 may determine a drilling state, equipment health, system health, a maintenance schedule, or combination thereof. The rig computing resource environment 205 may also include a control process 243 that may utilize the sensor data 240, 242, 244 to optimize drilling operations, such as, for example, the control of drilling equipment to improve drilling efficiency, equipment reliability, and the like. For example, the acquired sensor data 242 may be utilized to derive a noise cancellation scheme to improve electromagnetic and mud pulse telemetry signal processing. The remote computing resource environment 206 may include a control process 245 substantially similar to the control process 243 that may be provided to the rig computing resource environment 205. The monitoring and control processes 241, 243, 245 may be implemented via, for example, a control algorithm, a computer program, firmware, or other suitable hardware and/or software.

The rig computing resource environment 205 may include various computing resources, such as, for example, a single computer or multiple computers. The rig computing resource environment 205 may further include a virtual computer system and a virtual database or other virtual structure for collected data, such as may include one or more resource interfaces (e.g., web interfaces) that facilitate the submission of application programming interface (API) calls to the various resources through a request. In addition, each of the resources may include one or more resource interfaces that facilitate the resources to access each other (e.g., to facilitate a virtual computer system of the computing resource environment to store data in or retrieve data from the database or other structure for collected data). The virtual computer system may include a collection of computing resources configured to instantiate virtual machine instances. A user may interface with the virtual computer system via the offsite user device 220 or the onsite user device 218. Other computer systems or computer system services may be utilized in the rig computing resource environment 205, such as a computer system or computer system service that provides computing resources on dedicated or shared computers/servers and/or other physical devices. The rig computing resource environment 205 may include a single server (in a discrete hardware component or as a virtual server) or multiple servers (e.g., web servers, application servers, or other servers). The servers may be, for example, computers arranged in physical and/or virtual configuration.

The rig computing resource environment 205 may also include a database that may be or comprise a collection of computing resources that run one or more data collections. Such data collections may be operated and managed by utilizing API calls. The data collections, such as sensor data 240, 242, 244, may be made available to other resources in the rig computing resource environment 205 or to user devices (e.g., onsite user device 218 and/or offsite user device 220) accessing the rig computing resource environment 205. The remote computing resource environment 206 may include similar computing resources to those described above, such as a single computer or multiple computers (in discrete hardware components or virtual computer systems).

Figure 4:
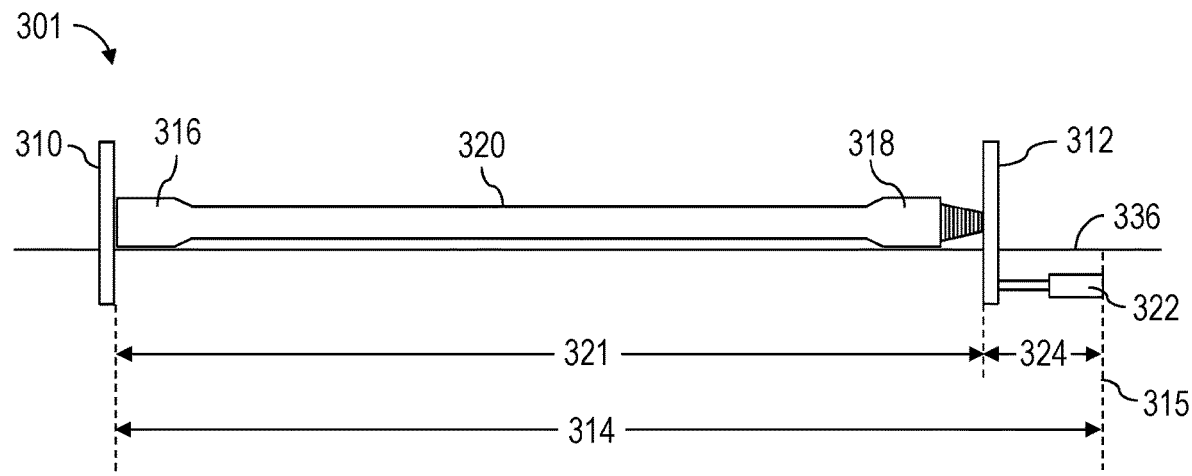
FIG. 4 is a schematic view of at least a portion of an example implementation of apparatus according to one or more aspects of the present disclosure.

FIG. 4 is a schematic view of at least a portion of an example implementation of a tubular measuring system 301 of the drilling system 100 according to one or more aspects of the present disclosure. The tubular measuring system 301 may be operable to measure position, length, diameter, and/or other dimensions of one or more portions of oil and gas tubulars, such as drill pipe, drill collars, and casing joints, among other examples. The tubular measuring system 301 may be further operable to measure position, length, diameter, and/or other dimensions of one or more portions of BHA tools, such as jars, crossover tools, mud motors, among other examples. The tubular measuring system 301 may comprise a stop or contact member 310 located at a distance 314 from a known reference position or datum 315 (e.g., a reference line) and configured to contact an end 316 of a tubular 320 (or a stand comprising two or more tubulars), and a contact member 312 configured to move toward the contact member 310 to contact opposing end 318 of the tubular 320. Although the end 316 of the tubular 320 is depicted as the box and the end 318 is depicted as the pin, it is to be understood that the tubular 320 may be positioned such that the pin of the tubular 320 may be in contact with the contact member 310 and the box of the tubular 320 may be in contact with the contact member 312.

The tubular measuring system 301 may further comprise a sensor 322 operable to generate a signal indicative of a distance 324 between the datum 315 and the contact member 312 when the contact member 310 is in contact with the end 316 of the tubular 320 and the contact member 312 is in contact with the end 318 of the tubular 320. The sensor 322 may be or comprise a position sensor operable to generate a signal or information indicative of the distance 324 between the datum 315 and the contact member 312. The sensor 322 may be disposed in association with the datum 315, the contact member 312, extend between the datum 315 and the contact member 312, or otherwise disposed such as may facilitate monitoring of the distance 324. The sensor 322 may be in signal communication with one or more processing devices (such as the processing device 510 shown in FIG. 11) of the control system 200. The signal generated by the sensor 322 may be received by the processing device, which may be operable to determine length 321 of the tubular 320 based on the distance 314 and the signal indicative of the distance 324 generated by the sensor 322.

The sensor 322 may be or comprise a linear encoder, a linear potentiometer, a capacitive sensor, an inductive sensor, a magnetic sensor, an optical sensor, a digital image camera, a linear variable-differential transformer (LVDT), a proximity sensor, a Hall effect sensor, and/or a reed switch, among other examples.

Figure 5:
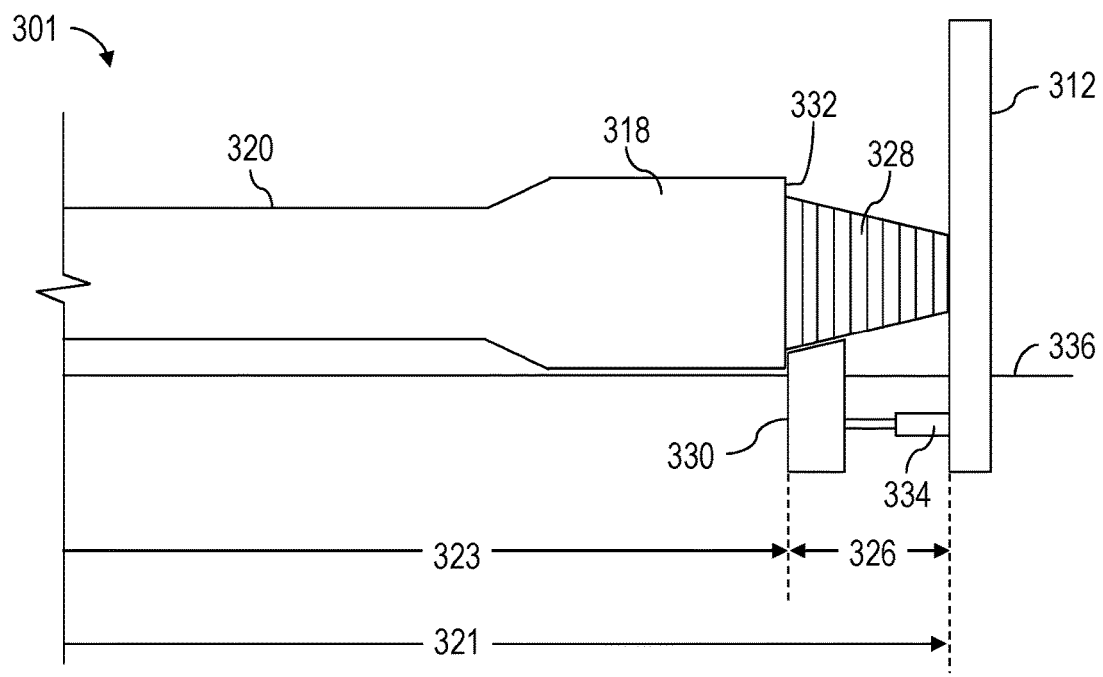
FIG. 5 is an enlarged view of a portion of the apparatus shown in FIG. 4 according to one or more aspects of the present disclosure.

FIG. 5 is an enlarged view of a portion of an example implementation of the tubular measuring system 301 shown in FIG. 4 according to one or more aspects of the present disclosure. The tubular measuring system 301 may be further operable to measure the length 326 of a thread 328 of the end 318 of the tubular 320 and determine length 323 of the tubular 320 without the thread 328. For example, the tubular measuring system 301 may further comprise a contact member 330 operable to move into contact with a face 332 at the base of the thread 328. The tubular measuring system 301 may further comprise a sensor 334 operable to generate a signal indicative of the distance 326 between the contact member 312 and the contact member 330 when the contact member 312 is in contact with the end 318 of the tubular 320 and the contact member 330 is in contact with the face 332. The sensor 334 may be disposed in association with the contact member 312 or the datum 315, the contact member 330, extend between the contact member 330 and the contact member 312, or otherwise disposed such as may facilitate monitoring of the distance 326. The sensor 334 may be or comprise a position sensor having a structure and/or mode of operation similar to the sensor 322, and operable to generate a signal or information indicative of distance 326 between the contact member 312 and the contact member 330. The sensor 334 may be in signal communication with one or more processing devices (e.g., the processing device 510 shown in FIG. 11) of the control system 200. The signal generated by the sensor 334 may be received by the processing device, which may be operable to determine the length 326 of the thread 328 and the length 323 of the tubular 320 by subtracting the distances 324, 326 from the distance 314.

In an example implementation of the tubular measuring system 301, the contact member 330 may be omitted and the contact member 312 may be adapted to make contact with the face 332 of the tubular 320, such as may permit determination of the length 323 without utilizing two contact members 312, 330. From example, the contact member 312 may include a hole, an arm, or another structure, such as may permit the contact member 312 to move past the thread 328 and contact the face 318.

The contact members 310, 312, 330 may be blocks, bars, or other structures supported on or along a tubular support surface 336 of tubular handling equipment of the drilling system 100. One or more of the contact members 310, 312, 330 may be selectively movable (e.g., retractable) above and below the tubular support surface 336. The tubular support surface 336 may be or form at least a portion of the catwalk 166 shown in FIG. 1 and/or the racks (not shown) adjoining the catwalk 166, among other examples. For example, the tubular support surface 336 may be or form at least a portion of the horizontal portion of the catwalk 166, wherein the contact members 310, 312, 330 may be disposed along the groove of the horizontal portion of the catwalk 166. During operations of the drilling system 100, after a tubular member 320 is transferred into the groove of the catwalk 166, the stop member 310 may extend above the surface 336 on one side of the tubular member 320 and the contact member 312 may move toward the tubular member 320 on the opposing side of the tubular member 320. Initially, the distance between the contact members 310, 312 may be larger than the expected maximum length 321 of the tubular 320. For example, the overall distance may initially be larger than the nominal length 321 of the tubular 320 plus a tolerance (e.g., between about 1% and about 10% of the length 321). Such tolerance may ensure that the tubular 320 is capable of being received between the contact members 310, 312.

If the end 316 of the tubular member 320 is not in contact with the contact member 310, the contact member 312 may push the tubular member 320 until the end 316 contacts the contact member 310. Once the contact members 310, 312 are in contact with opposing sides of the tubular 320, one or more processing devices of the control system 200 may receive a signal from the sensor 322 to determine the length 324. The control system 200 may then determine the length 321 of the tubular 320, by subtracting the length 324 from the known length 314. The control system 200 may also cause the contact member 330 to move into contact with the face 332 of the tubular 320. Once the contact member 330 is in contact with the face 332, one or more processing devices of the control system 200 may receive a signal from the sensor 334 to determine the length 326. The control system 200 may then determine the length 323 of the tubular 320, by subtracting the length 326 from the length 321. Once the length measurements are performed, the contact member 310 may be caused to retract below the surface 336 and the contact member 312 may push the tubular 320 further along the catwalk 166, as described above. In the example implementation of the tubular measuring system 301, the skate 168 of the catwalk 166 may be or comprise the contact member 312.

The distance 314 between the contact member 310 and the datum 315 may be measured with a high-degree of precision, as both the contact member 310 and the datum 315 may be set at fixed positions. Furthermore, the distances 324, 326 may be substantially less than the lengths 321, 323 and the fixed distance 314 by an order of magnitude (e.g., 1-3 feet in comparison to 10-30 feet) or more such that the lengths 321, 323 are substantially close in length to the distance 314. Thus, errors in the determined lengths 321, 323 may be based on the distances 324, 326 and may be an order of magnitude or more smaller than if the errors were based on measurements of the length 321, 323 of the entire tubular 320. For example, the distance 324, 326 may be between about 1% and about 20% (i.e., between about five and about one hundred times smaller than) of one or more of the distance 314 and lengths 321, 323. Accordingly, errors in the determined lengths 321, 323 may also be reduced by a factor ranging between about five and about one hundred. It is to be understood that the tubular measurement system 301 may also be utilized to measure stands (such as stands 340 shown in FIGS. 6-9) comprising two or more tubulars 320. The ability to measure the lengths 321, 323 of individual tubulars 320 or stands 340 with increased accuracy may facilitate an increased accuracy in keeping track or otherwise measuring length of an entire tubular string as it is assembled and deployed downhole.

Although FIGS. 4 and 5 show the tubular measuring system 301 utilized to measure the tubular 320 while oriented horizontally, it is to be understood that the tubular measuring system 301 may be utilized to measure the tubular 320 while oriented vertically. For example, the tubular measuring system 301 may be incorporated into or form at least a portion of the fingerboard 184, such as may permit the tubular measuring system 301 to measure the tubular 320 while stored vertically within the fingerboard 184.

Figure 6:
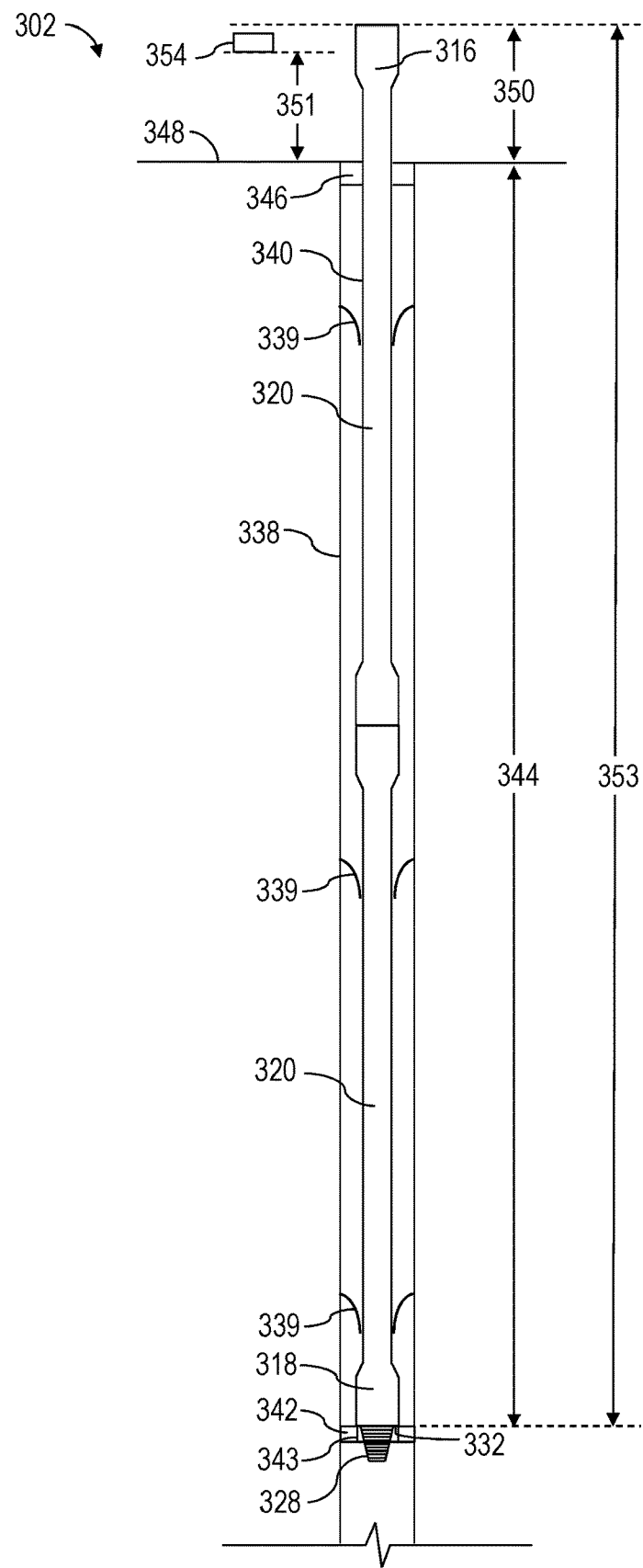
FIG. 6 is a schematic view of at least a portion of an example implementation of apparatus according to one or more aspects of the present disclosure.

Another example implementation of the tubular measuring system may be incorporated within or form at least a portion of an earthen rat hole. FIG. 6 is a schematic view of a portion of an example implementation of a tubular measuring system 302 located at least partially within a rat hole 338 of the drilling system 100 according to one or more aspects of the present disclosure. The tubular measuring system 302 may comprise one or more similar features of the tubular measuring system 301, including where indicated by like reference numbers.

A tubular or a tubular stand 340, comprising two or more tubulars 320, may be positioned in the rat hole 338 such that the end 318 (i.e., the pin end) may contact a pipe stop or another contact member 342 positioned at a known depth or position in the rat hole 338. The contact member 342 may include a central opening 343, such as may receive the threads 328 and permit the face 332 to contact the contact member 342. A movable block 346 may engage the stand 340 at or above a top surface 348 of the rat hole 338. The movable bock 346 may be or comprise a pivotable cover, tongs, and/or another structure configured to engage the stand 340 at a set distance. A distance 344 between the top surface 348 (or the movable block 346) and the pipe stop 342 may be known with a high degree of precision (e.g., may be a generally fixed or static distance). A distance 350 between top of end 316 (e.g., the box end) and the top surface 348 (or the movable block 346) may then be determined. One or more centralizers 339 may be utilized within the rat hole 338 to help maintain the stand 340 substantially vertical and/or centralized within the rat hole 338. The centralizers 339 may be or comprise biasing members, such as fingers, leafs springs, disks, or other flexible members, such as may be operable to bias the stand 340 toward a substantially vertical and/or central position within the rat hole 338.

The distance 350 may be monitored via a sensor 354 disposed at a known position or distance 351 with respect to the top surface 348 (or the movable block 346) and operable to generate a signal indicative of the distance 350. The distance 351 may be chosen or otherwise determined based on an estimated expected position of the end 316 (i.e., stick-up height) or otherwise disposed such as may facilitate monitoring of the distance 350. The sensor 354 may be in signal communication with one or more processing devices (such as the processing device 510 shown in FIG. 11) of the control system 200. The signal generated by the sensor 354 may be received by the processing device, which may be operable to determine the distance 350 and, thus, length of the stand 353, based on the received signal and the height 351. Similarly as described above with respect to the distance 324, the distance 350 may be substantially less than the distances 344, 33. The sensor 354 may be or comprise a position sensor having a structure and/or mode of operation similar to the sensor 322 and operable to generate a signal or information indicative of distance 350 between the surface 348 and the end 316 of the stand 340. The sensor 354 may also be a digital image camera utilized similarly as described below in association with tubular measuring systems 304, 305 shown in FIGS. 8 and 9, respectively. Length 353 of the stand 340 may then be determined by adding together the distances 344, 350. Because the measured distance 350 is a substantially shorter than the known distance 344, errors in the determined length 353 may be based on the shorter measured distance 350 and may not include errors associated with measurement of the known distance 344.

FIG. 7 is a schematic view of a portion of an example implementation of a tubular measuring system 303 of the drilling system 100 according to one or more aspects of the present disclosure. The tubular measuring system 303 may comprise one or more similar features of the tubular measuring systems 301, 302, including where indicated by like reference numbers, except as described below. The tubular measuring system 303 may be operable to measure position, length, diameter, and/or other dimensions of one or more portions of oil and gas tubulars 320, stands 340 comprising two or more tubulars 320, and other BHA tools.

The tubular measuring system 303 may comprise a contact member 356 operable to contact an end 316 of a stand 340 and a contact member 358 operable to move toward the contact member 356 to contact an end 318 of the stand 340, which may be supported on or along a tubular support surface 336 of tubular handling equipment. The contact member 358 may be operatively connected with or carry a sensor 360 operable to generate a signal indicative of a distance 352 between the contact members 356, 358 when the contact member 356 is in contact with the end 316 of the stand 340 and the contact member 358 is in contact with the end 318 of the stand 340. The sensor 360 may be or comprise a position sensor operable to generate a signal or information indicative of the distance 352 between the contact members 356, 358. The sensor 360 may be disposed in association with the contact member 356, the contact member 358, extend between the contact members 356, 358, or otherwise disposed such as may facilitate monitoring of the distance 352. The sensor 360 may be in signal communication with one or more processing devices (such as the processing device 510 shown in FIG. 11) of the control system 200. The signal generated by the sensor 360 may be received by the processing device, which may be operable to determine the distance 352 and, thus, length of the stand 340, based on the received signal.

The sensor 360 may be or comprise a position sensor having a structure and/or mode of operation similar to the sensor 322 and operable to generate a signal or information indicative of the distance 352. The sensor 360 may comprise multiple components. For example, the sensor 360 may comprise a signal transceiver operable in conjunction with a reflector or another marker 364. The transceiver may be operable to transmit energy or a signal toward the marker 364 and receive the signal reflected by the marker 364. The transceiver may then generate a signal indicative of the distance 352 based on the received signal.

The sensor 360 may be or comprise an optical distance measurement device, such as a digital image camera. The camera may be aimed at the marker 364, which may contain a plurality of pixels or other images thereon. The camera may be utilized to determine the distance 352, for example, based on a count of the pixels occupied by the marker 364 in the digital image captured by the camera. Similarly, the camera (or a second camera, or another optical distance measurement device) may be further utilized to determine a distance 326 between the face 332 and the contact member 358. For example, a captured digital image of the stand 340, including the face 332, may be analyzed and the distance 326 may be determined based on, for example, the size of the face 332 captured in the digital image. Length 353 of the stand 340 may be determined by subtracting the length 326 of the threads 328 from the length 352 between the contact members 356, 358.

FIG. 8 is a schematic view of a portion of an example implementation of a tubular measuring system 304 of the drilling system 100 according to one or more aspects of the present disclosure. The tubular measuring system 304 may comprise one or more similar features of the tubular measuring systems 301, 302, 303 including where indicated by like reference numbers. The tubular measuring system 304 may be operable to measure position, length, diameter, and/or other dimensions of one or more portions of oil and gas tubulars 320, stands 340 comprising two or more tubulars 320, and other BHA tools.

The tubular measuring system 304 may comprise a contact member 356 operable to contact an end 316 of the stand 340, which may be supported on or along a tubular support surface 336 of tubular handling equipment. The tubular measuring system 304 may further comprise a digital image camera 366 positioned at a known reference position 370 (e.g., a reference line) at a known distance 368 with respect to the contact member 356 and directed or aimed toward the end 318 of the stand 340, such as may permit the camera 366 to capture a digital image of the end 318 when the contact member 356 is in contact with the end 316 of the stand 340. The camera 366 may be in signal communication with one or more processing devices (such as the processing device 510 shown in FIG. 11) of the control system 200. The digital image generated by the camera 366 may be received by the processing device, which may be operable to analyze the image to determine the lengths 352, 353 of the stand 340 by determining the distance 372 between the position 370 and the tip of the end 318 and the distance 373 between the position 370 and the face 332. For example, a captured digital image of the end 318 may be analyzed by the control system 200 to determine an angle 374 between the tip of the threads 328 and the position 370 to determine the distance 372 and an angle 376 between the face 332 and the position 370 to determine the distance 373. Length 352 of the stand 340 may be determined by adding the distance 368 and the determined distance 372, and the length 353 of the stand 340 may be determined by adding the distance 368 and the determined distance 373. The length 326 of the threads 328 may be determined by subtracting the distance 373 from the distance 372. Similarly as described above with respect to the relationship between the distance 324 and the distance 314 and lengths 321, 323, the measured distances 372, 373 may be substantially less than the known distance 368 and lengths 352, 353. Accordingly, errors in the determined lengths 352, 353 may be based on the shorter measured distances 372, 373.

Figure 9:
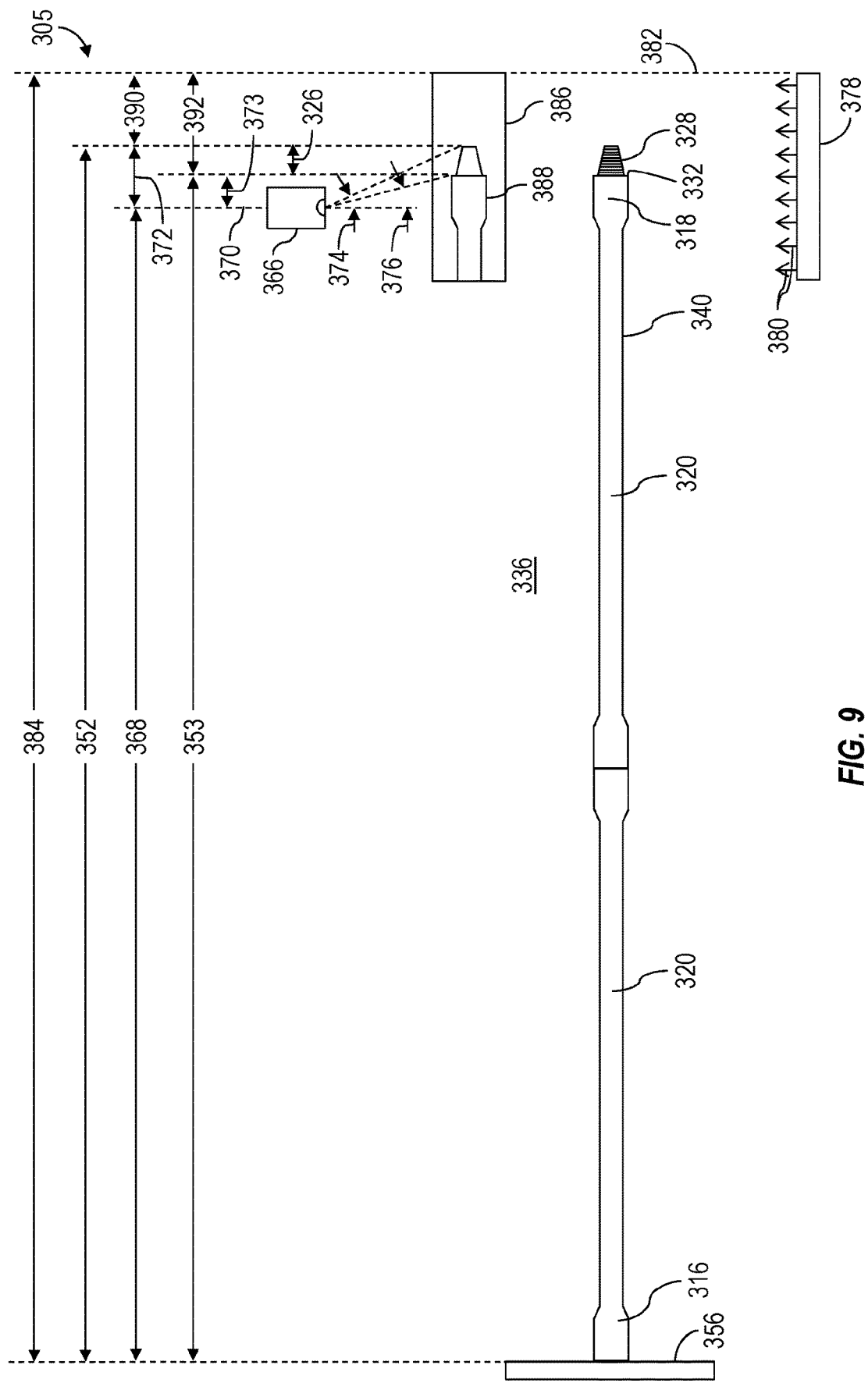
FIG. 9 is a schematic view of at least a portion of an example implementation of apparatus according to one or more aspects of the present disclosure.

FIG. 9 is a schematic view of a portion of an example implementation of a tubular measuring system 305 of the drilling system 100 according to one or more aspects of the present disclosure. The tubular measuring system 305 may comprise one or more similar features of the tubular measuring systems 301, 302, 303, 304 including where indicated by like reference numbers. The tubular measuring system 305 may be operable to measure position, length, diameter, and/or other dimensions of one or more portions of oil and gas tubulars 320, stands 340 comprising two or more tubulars 320, and other BHA tools.

The tubular measuring system 305 may comprise a contact member 356 operable to contact an end 316 of a stand 340, which may be supported on or along a tubular support surface 336 of tubular handling equipment. The tubular measuring system 305 may further comprise a source 378 of electromagnetic radiation or other signals or energy 380 positioned at a known reference position 382 (e.g., reference line) at a known distance 384 with respect to the contact member 356. The tubular measuring system 305 may further comprise a sensor surface or another receiver 386 located at the position 382 and operable to detect the radiation or signals transmitted by the source 378. The source 378 and the receiver 386 may be disposed on opposing sides of the end 318 of the stand 340, such as may permit the radiation or signals 380 transmitted by the source 378 to be partially blocked by the end 318 and, thus, form a shadow image or profile 388 of the end 318 upon the receiver 386. The source 378 may be operable to emit and the receiver 386 may be operable to detect signals or energy such as electromagnetic radiation, light, infrared radiation, ultraviolet radiation, ultrasonic waves, electromagnetism, sonic waves, among other examples.

The receiver 386 may generate a signal or information indicative of the profile 388 and, thus, dimensions and/or relative positions of various portions of the end 318 when the contact member 356 is in contact with the end 316 of the stand 340. The receiver 386 may be in signal communication with one or more processing devices (such as the processing device 510 shown in FIG. 11) of the control system 200. The signal generated by the receiver 386 may be received by the processing device, which may be operable to analyze the signal to determine the dimensions of the end 318, including the length 326 of the thread 328. The processing device may further utilize the received signals to determine distance 390 between the position 382 and the tip of the thread 328 and distance 392 between the position 382 and the face 332. Length 352 of the stand 340 may be determined by subtracting the determined distance 390 from the known distance 384, and length 353 of the stand 340 may be determined by subtracting the determined distance 392 from the known distance 384. Similarly as described above with respect to the relationship between the distances 324, 326 and the distance 314 and lengths 321, 323, the measured distances 390, 392 may be substantially less than the known distance 384 and lengths 352, 353. Accordingly, errors in the determined lengths 352, 353 may be based on the shorter measured distances 390, 392.

Instead of the receiver 386 being or comprising a sensor operable to generate a signal or information based on the profile 388, the receiver 386 may be or comprise a simple screen or surface upon which the shadow image or profile 388 may be formed. A digital image camera 366 may be positioned at a known reference position 370 at a known distance 368 with respect to the contact member 356 and directed or aimed toward the receiver 386. The camera 366 may be operated to capture a digital image of the profile 388 when the contact member 356 is in contact with the end 316 of the stand 340. The captured digital image of the profile 388 may then be analyzed by the control system 200 to determine the distances 352, 353 of the stand 340, as described above. The length 352 of the stand 340 may be determined by adding the determined distance 372 to the known distance 368, and the length 353 of the stand 340 may be determined by adding the determined distance 373 to the known distance 368. Similarly as described above with respect to the relationship between the distances 324, 326 and the distance 314 and lengths 321, 323, the measured distances 372, 373 may be substantially less than the known distance 368 and lengths 352, 353. Accordingly, errors in the determined lengths 352, 353 may be based on the shorter measured distances 372, 373.

Similarly to the tubular measuring system 301 shown in FIGS. 1 and 2, the tubular measuring systems 303, 304, 305 shown in FIGS. 7-9 may be incorporated as a part of or form at least a portion of a piece of tubular handling equipment of the drilling system 100. The contact members 356 may be blocks, bars, or other structures supported on or along a tubular support surface 336 of tubular handling equipment of the drilling system 100. The contact members 356 may be selectively movable (e.g., retractable) above and below the tubular support surface 336. The tubular support surface 336 may be or form at least a portion of the catwalk 166 shown in FIG. 1 and/or the racks (not shown) adjoining the catwalk 166, among other examples. For example, the tubular support surface 336 may be or form at least a portion of the horizontal portion of the catwalk 166 and the contact member 356 may be or form at least a portion of the skate 168 of the catwalk 166. During operations of the drilling system 100, the tubular stand 340 may be transferred into the groove of the catwalk 166 such that the end 316 is in contact with the contact member 356. If the sensor 360 is utilized, the contact member 358 may move toward the tubular stand 340 into contact with the end 318. Once the contact members 356 and/or 358 are in contact with the tubular stand 340, the sensor 360, 366 and the processing device may be utilized to determine the length of the thread 326 and/or the lengths 352, 353 of the stand 340. The tubular measuring systems 303, 304, 305 may also be utilized to measure the lengths 326, 352, 353 while the stand 340 is oriented vertically. For example, the tubular measuring systems 303, 304, 305 may be incorporated as a part of or form at least a portion of the fingerboard 184 or another piece of the tubular handling equipment of the drilling system 100.

Figure 10:
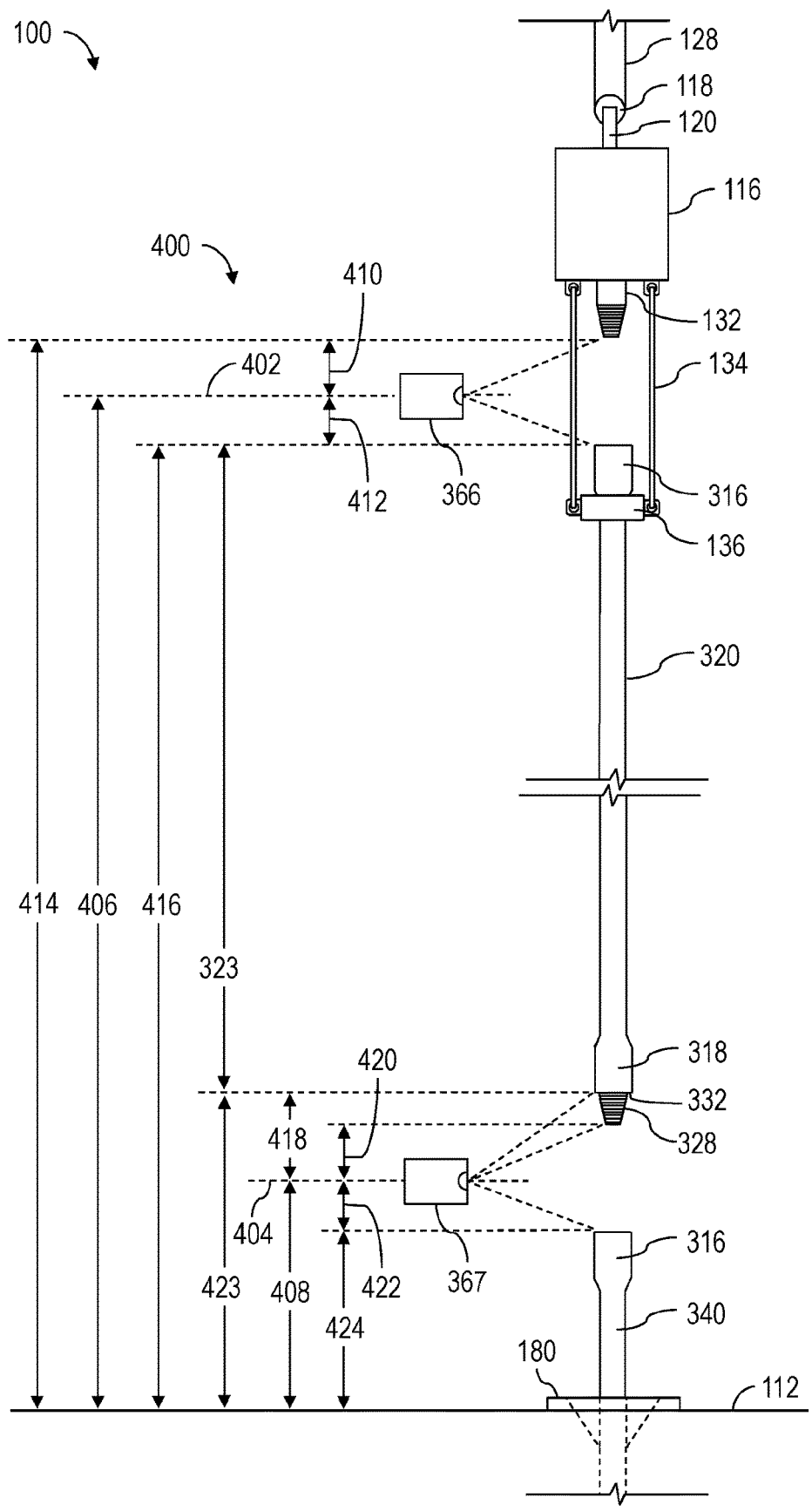
FIG. 10 is a schematic view of at least a portion of an example implementation of apparatus according to one or more aspects of the present disclosure.

FIG. 10 is a schematic view of a portion of an example implementation of a tubular measuring system 400 of the drilling system 100 according to one or more aspects of the present disclosure. The tubular measuring system 400 may comprise one or more similar features of the tubular measuring systems 301-305, including where indicated by like reference numbers, except as described below. The tubular measuring system 400 may be operable to measure position, length, diameter, and/or other dimensions of one or more portions of oil and gas tubulars 320 or stands 340 comprising two or more tubulars 320.

The tubular measuring system 400 may utilize one or more digital image cameras positioned at or along known reference positions 402, 404 (e.g., reference lines) of the drilling system 100 at known distances 406, 408 with respect to a predetermined datum, such as a rig floor 112 of the drilling system 100. For example, an upper camera 366 may be supported along a mast 114 (shown in FIG. 1) and directed or aimed toward a top drive 116, including the elevator 136. Such positioning and direction may permit the upper camera 366 to capture digital images of upper ends 316 of tubulars 320 (or stands 340) and various portions of the top drive 116 as the tubulars 320 are lifted by the elevator 116 and the upper ends 316 are engaged by a drive shaft 132 to rotate the tubular 320 during tubular running (e.g., drilling) operations. A lower camera 367 may also or instead be supported along the rig floor 112 and directed or aimed toward a lower end 318 of a suspended tubular 320 and an upper end 316 of a tubular 320 extending into a wellbore 104 and above the rig floor 112 (i.e., stick-up). Such positioning and direction may permit the lower camera 366 to capture digital images of various portions of the ends 316, 318 prior to and as the ends 316, 318 are made up during tubular running operations.

The cameras 366, 367 may be in signal communication with one or more processing devices (such as the processing device 510 shown in FIG. 11) of the control system 200. The digital images generated by the cameras 366, 367 may be received by the processing device, which may be operable to analyze the images to determine positions of various portions of the tubulars 320 and/or portions of the top drive 116.

For example, the digital images captured by the upper camera 366 may be analyzed by the control system 200 to determine the position of the drive shaft 132 and/or the position of the upper end 316 of the tubular 320. Similarly as described above, the digital images captured by the upper camera 366 may be analyzed to determine an angle between the drive shaft 132 and the position 402 of the upper camera 366 to determine distance 410, and to determine an angle between the upper end 316 and the position 402 to determine distance 412. Position of the drive shaft 132, identified as distance 414 with respect to the rig floor 112, may be determined by adding the determined distance 410 and the known distance 406. Position of the top end 316, identified as distance 416 with respect to the rig floor 112, may be determined by subtracting the determined distance 412 from the known distance 406.

The digital images captured by the lower camera 367 may be analyzed by the control system 200 to determine the position of the lower end 318 of the tubular 320 being moved by the elevator 136 and/or the position of the upper end 316 of the tubular 320 partially deployed within the wellbore 104. Similarly as described above, a digital image captured by the lower camera 367 may be analyzed to determine an angle between the face 332 and the position 404 of the lower camera 367 to determine distance 418, to determine an angle between the tip of the threads 328 and the position 404 to determine distance 420, and to determine an angle between the upper end 316 and the position 404 to determine distance 422. Position of the face 332 of the lower end 318, identified as distance 423 with respect to the rig floor 112, may be determined by adding the determined distance 418 and the known distance 408. Position of the top end 316, identified as distance 424 (i.e., stick-up height) with respect to the rig floor 112, may be determined by subtracting the determined distance 422 from the known distance 408. The various distances described above may be continuously determined in real-time during trip-in and trip-out operations to monitor absolute and/or relative positions of the top drive 116 and the tubulars 320.

The digital images captured by the upper camera 366 and/or the lower camera 367 may be further analyzed by the control system 200 to determine certain dimensions of the tubular 320. For example, the length of the threads 328 may be determined by subtracting the distances 408, 420 from the distance 423. The length 323 of the tubular 320 may be determined by subtracting the distance 423 from the distance 416. Diameters of certain portions of the tubular 320 may be determined by analyzing the digital images captured by the upper camera 366 and/or the lower camera 367 to determine angles between side surfaces of the tubular 320 and the positions 402, 404 of the upper camera 366 and/or the lower camera 367. The diameters of the tubular 320 may be determined based on the determined angles in a similar manner utilized to determine distances between portions of the tubular 320, as described above.

The lengths of the tubulars 320 and/or stands 340 may be continuously determined in real-time during trip-in and trip-out operations to monitor weight of the tubular string (i.e., hook load) as it is being assembled and disassembled. For example, the length 323 of the tubular 320 (or length 353 of a stand 340) may be monitored before and after pick-up of the tubular string out of slips 180 and compared to determine the difference in length 323 (i.e., stretch or strain) before and after pick-up. Accordingly, based on mechanical and material properties of the tubular 320 and the stretch after pick-up, the weight of the tubular string may be determined.

Although the tubular measuring systems 301-305 and 400 shown in FIGS. 1-10 are shown measuring lengths and other dimensions of the tubular members 320 and tubular stands 340, the tubular measuring systems 301-305 and 400 may be utilized to measure lengths and other dimensions of other downhole tools, including one or more portions of a BHA, such as described above. Such measuring operations may be performed in a substantially similar manner to the measuring operations described above to measure the tubular members 320 and the tubular stands 340.

Various portions of the apparatuses described above and shown in FIGS. 1 and 4-10 may collectively form at least a portion of and/or be controlled by the control system 200 shown in FIGS. 2 and 3. FIG. 11 is a schematic view of a portion of an example implementation of the control system 200 according to one or more aspects of the present disclosure. The following description refers to one or more of FIGS. 1-11.

The control system 200 may comprise one or more processing devices 510, which may be in communication with various portions of the drilling system 100, including various tubular handling equipment and sensors described within the scope of the present disclosure. For example, the processing device 510 may be in signal communication with the catwalk 166, the PHM 182, the top drive 116, the drawworks 124, the tubular handling assembly 134, the sensors 322, 334, 354, 360, 386, including the emitter 378 and the digital image cameras 366, 367. For clarity, these and other components in communication with the processing device 510 will be collectively referred to hereinafter as "sensor and operated equipment." The processing device 510 may be operable to receive coded instructions 532 from the human operator and signals generated by the sensors 322, 334, 354, 360, 386 and the digital image cameras 366, 367, process the coded instructions 532 and the signals, and communicate control signals to the tubular handling equipment to execute the coded instructions 532 to implement at least a portion of one or more example methods and/or processes described herein, and/or to implement at least a portion of one or more of the example systems described herein. The processing device 510 may be or form at least a portion of one or more of the remote computing resource environment 206, the coordinated control device 204, the controllers 226, 232, 238, or other portions of the control system 200 described above.

The processing device 510 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The processing device 510 may comprise a processor 512, such as a general-purpose programmable processor. The processor 512 may comprise a local memory 514, and may execute coded instructions 532 present in the local memory 514 and/or another memory device. The processor 512 may execute, among other things, the machine-readable coded instructions 532 and/or other instructions and/or programs to implement the example methods and/or processes described herein. The programs stored in the local memory 514 may include program instructions or computer program code that, when executed by an associated processor, facilitate the drilling system 100 to perform the example methods and/or processes described herein. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 512 may be in communication with a main memory 517, such as may include a volatile memory 518 and a non-volatile memory 520, perhaps via a bus 522 and/or other communication means. The volatile memory 518 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by a tangible, non-transitory storage medium, such as read-only memory, flash memory, and/or other types of memory devices. One or more memory controllers (not shown) may control access to the volatile memory 518 and/or non-volatile memory 520.

The processing device 510 may also comprise an interface circuit 524. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may also comprise a graphics driver card. The interface circuit 524 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensor and operated equipment may be connected with the processing device 510 via the interface circuit 524, such as may facilitate communication between the sensor and operated equipment and the processing device 510.

One or more input devices 526 may also be connected to the interface circuit 524. The input devices 526 may permit the human operators to enter the coded instructions 532, including control commands, operational set-points, and/or other data for use by the processor 512. The input devices 526 may be, comprise, or be implemented by a keyboard, a mouse, a touchscreen, a track-pad, a trackball, an isopoint, and/or a voice recognition system, among other examples.

One or more output devices 528 may also be connected to the interface circuit 524. The output devices 528 may be, comprise, or be implemented by display devices (e.g., a liquid crystal display (LCD), a light-emitting diode (LED) display, or cathode ray tube (CRT) display), printers, and/or speakers, among other examples. The processing device 510 may also communicate with one or more mass storage devices 530 and/or a removable storage medium 534, such as may be or include floppy disk drives, hard drive disks, compact disk (CD) drives, digital versatile disk (DVD) drives, and/or USB and/or other flash drives, among other examples.

The coded instructions 532 may be stored in the mass storage device 530, the main memory 517, the local memory 514, and/or the removable storage medium 534. Thus, the processing device 510 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code (e.g., software or firmware) thereon for execution by the processor 512.

The coded instructions 532 may include program instructions or computer program code that, when executed by the processor 512, may cause the drilling system 100 to perform methods, processes, and/or routines described herein. For example, the processing device 510 may receive, process, and record the operational set-points entered by the human operator and the signals generated by the sensors 322, 334, 354, 360, 386 and/or the digital image cameras 366, 367. Based on the received operational set-points and the generated signals, the processing device 510 may send control signals or information to the tubular handling equipment to automatically perform and/or undergo one or more operations or routines described herein or otherwise within the scope of the present disclosure.

Figure 12:
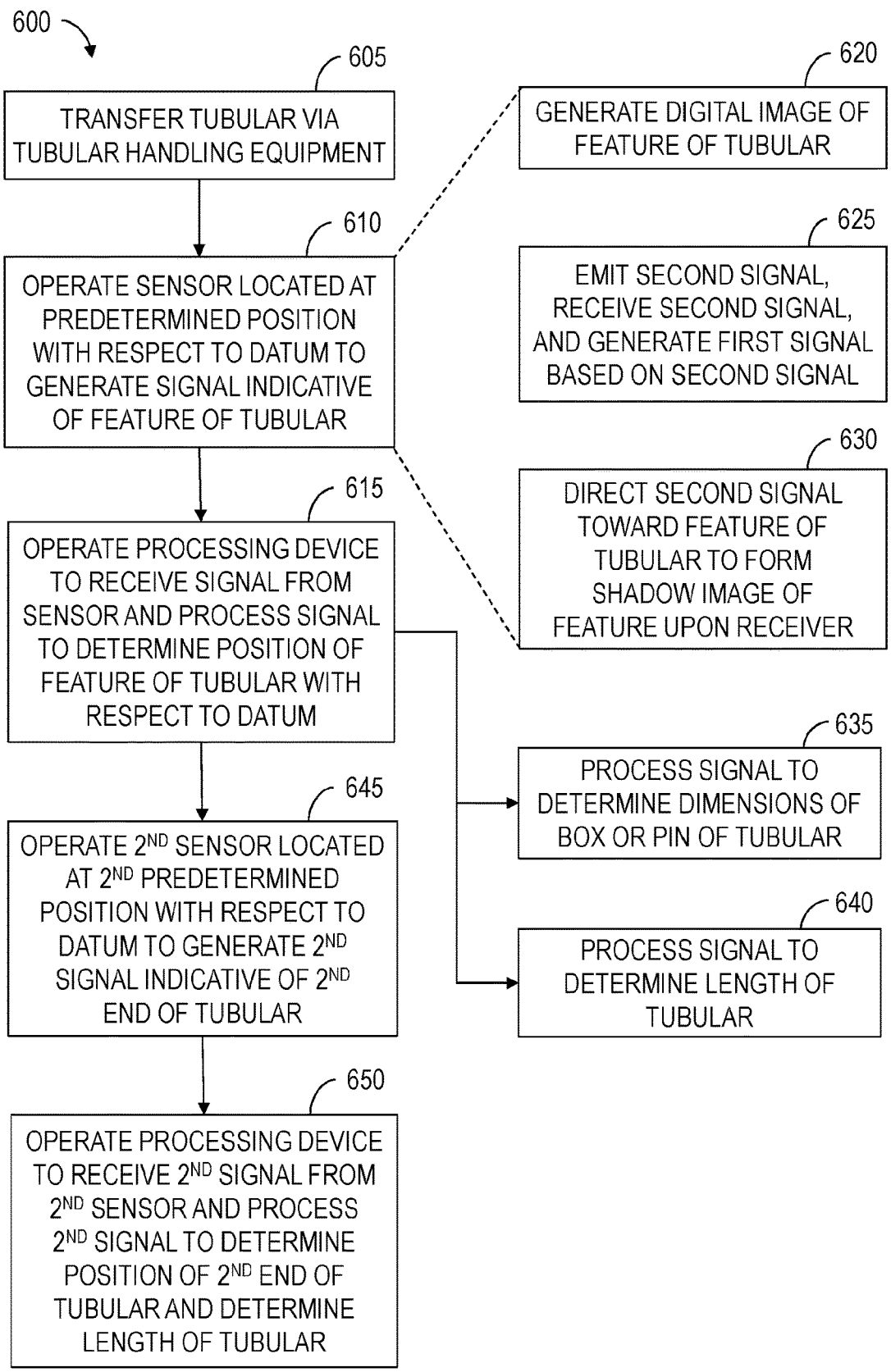
FIG. 12 is a flow-chart diagram of at least a portion of an example implementation of a method according to one or more aspects of the present disclosure.

FIG. 12 is a flow-chart diagram of at least a portion of an example implementation of a method (600) according to one or more aspects of the present disclosure. The method (600) may be performed utilizing or otherwise in conjunction with at least a portion of one or more implementations of one or more instances of the apparatuses shown in one or more of FIGS. 1-11 and/or otherwise within the scope of the present disclosure. The method (600) may be performed manually by the human operator and/or performed or caused, at least partially, by the processing device 510 executing the coded instructions 532 according to one or more aspects of the present disclosure. Thus, the following description of the method (600) also refers to apparatuses shown in one or more of FIGS. 1-11. However, the method (600) may also be performed in conjunction with implementations of one or more apparatuses other than those depicted in FIGS. 1-11 that are also within the scope of the present disclosure.

The method (600) includes transferring (605) a tubular 320 via tubular handling equipment 124, 134, 136, 166, 182 during oil and gas drilling operations and operating (610) a sensor 322, 334, 354, 360, 386 located at a predetermined position with respect to a datum 310, 342, 356, 112 to generate a signal indicative of a feature of the tubular 320. The method (600) may further include operating (615) a processing device 510 having a processor 512 and a memory 517 storing computer program code 532 to receive the signal from the sensor 322, 334, 354, 360, 386 and process the received signal to determine position of the feature of the tubular 320 with respect to the datum 310, 342, 356, 112.

The tubular handling equipment may be located in association with an oil and gas drilling rig 111 and the sensor 322, 334, 354, 360, 386 may be disposed in association with the tubular handling equipment 124, 134, 136, 166, 182. The sensor may be a digital image camera 366, and operating (615) the sensor may include generating (620) a digital image of the feature of the tubular 320.

The signal generated by the sensor 322, 334, 354, 360, 386 may be a first signal and the sensor may include an emitter 360, 378 and a receiver 360, 386, such that operating (610) the sensor may include (625) emitting a second signal, receiving the second signal, and generating the first signal based on the second signal. Operating (610) the sensor 322, 334, 354, 360, 386 may further comprise directing (630) the second signal toward the feature of the tubular 320 to form a shadow image 388 of the feature of the tubular 320 upon the receiver 386, wherein the first signal may be based on the shadow image 388 of the feature of the tubular 320. The second signal may be or include electromagnetic radiation, light, infrared radiation, electromagnetism, or ultrasonic waves.

The feature of the tubular 320 may be or include a box 316 or pin 318 of the tubular 320, such that operating (615) the processing device 510 may include processing (635) the received signal to determine dimensions of the box 316 or pin 318 of the tubular 320. Furthermore, the feature of the tubular 320 may be or include a first end 316 of the tubular 320 and a second end 318 of the tubular 320 may be positioned at the datum 310, 342, 356, 112, such that operating (615) the processing device 510 may include processing (640) the received signal to determine length 321, 323, 352, 353 of the tubular 320.

Within the scope of the method (600) the sensor 322, 334, 354, 360, 386 may be a first sensor, the feature of the tubular 320 may be a first end 316 of the tubular, the signal may be a first signal, the predetermined position 402 with respect to the datum 112 may be a first predetermined position 402 with respect to the datum 112. Such method (600) may further include operating (645) a second sensor 322, 334, 354, 360, 386 located at a second predetermined position 404 with respect to the datum 112 to generate a second signal indicative of a second end 318 of the tubular 320. The method (600) may further include operating (650) the processing device 510 to receive the second signal from the second sensor and process the received second signal to 1) determine position 423 of the face 332 of the second end 318 of the tubular 320 with respect to the datum 112, and 2) determine length 323 of the tubular 320 based on the determined positions 416, 423 of the first and second ends 316, 318 of the tubular 320.

Figure 13:
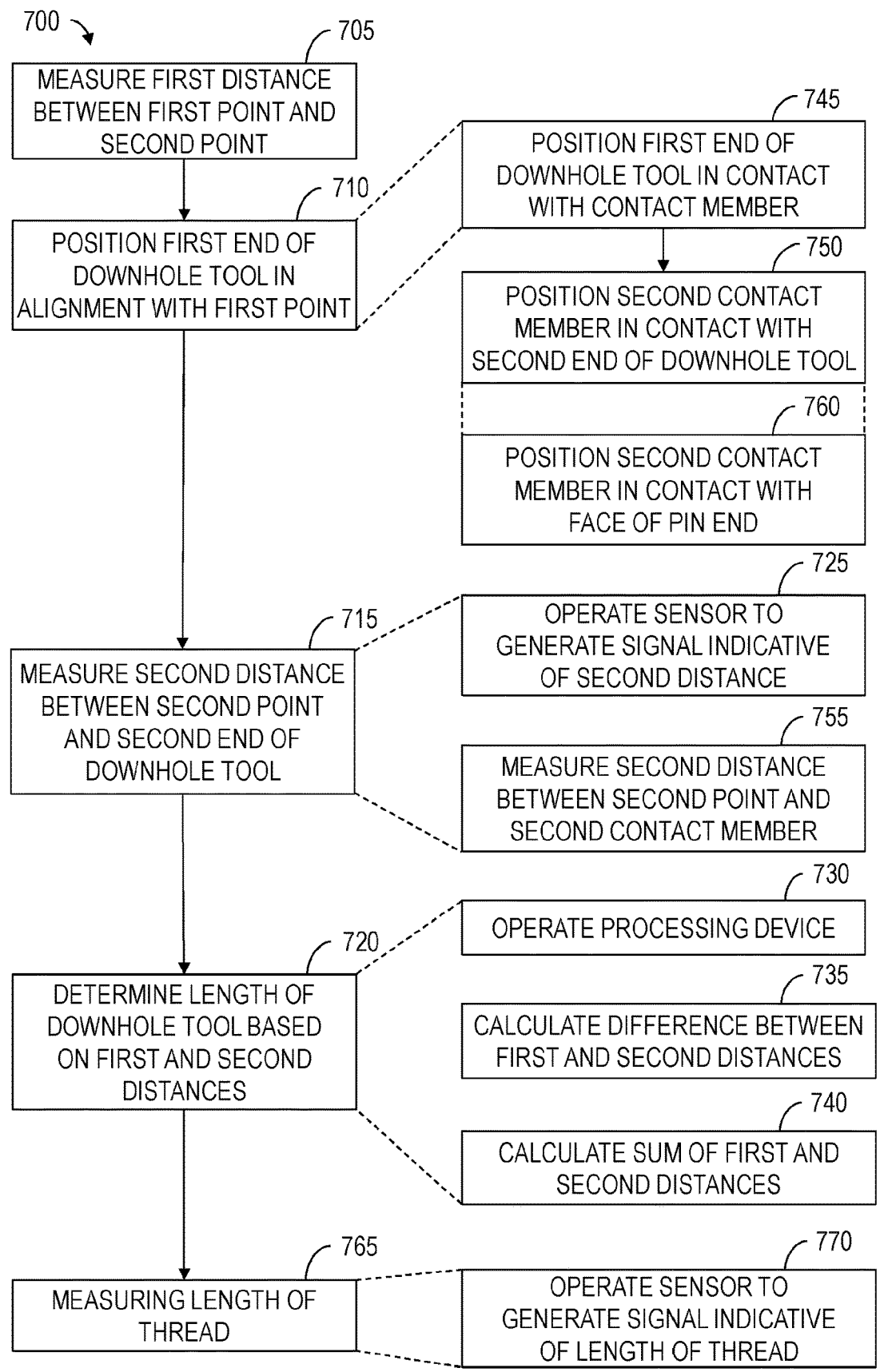
FIG. 13 is a flow-chart diagram of at least a portion of an example implementation of a method according to one or more aspects of the present disclosure.

FIG. 13 is a flow-chart diagram of at least a portion of an example implementation of a method (700) according to one or more aspects of the present disclosure. The method (700) may be performed utilizing or otherwise in conjunction with at least a portion of one or more implementations of one or more instances of the apparatuses shown in one or more of FIGS. 1-11 and/or otherwise within the scope of the present disclosure. The method (700) may be performed manually by the human operator and/or performed or caused, at least partially, by the processing device 510 executing the coded instructions 532 according to one or more aspects of the present disclosure. Thus, the following description of the method (700) also refers to apparatuses shown in one or more of FIGS. 1-11. However, the method (700) may also be performed in conjunction with implementations of one or more apparatuses other than those depicted in FIGS. 1-11 that are also within the scope of the present disclosure.

The method (700) includes measuring (705) a first distance 314, 368 between a first point 310, 356 and a second point 315, 370, positioning (710) a first end 316 of a downhole tool 320, 340 in alignment with the first point 310, 356 measuring (715) a second distance 324, 373 between the second point 315, 370 and a second end 318 of the downhole tool 320, 340, and determining (720) length 321, 352 of the downhole tool 320, 340 based on the first 314, 368 and second 324, 373 distances. The downhole tool 320, 340 may be or comprises a drill pipe, a drill collar, or a casing joint. The downhole tool 320, 340 may be or comprises a portion 109 of a bottom hole assembly 108.

Within the scope of the method (700), the first 310, 356 and second 315, 370 points may be positionally fixed and/or the second distance 324, 373 may be substantially smaller than the length 321, 352 of the downhole tool 320, 340. For example, the second distance 324, 373 may be between 1% and 20% of the length 321, 352 of the downhole tool 320, 340.

Furthermore, measuring (715) the second distance 324, 373 between the second point 315, 370 and the second end 318 of the downhole tool 320, 340 may comprise operating (725) a sensor 322, 366 to generate a signal indicative of the second distance 324, 373. The sensor may be or comprises a digital image camera 366.

Determining (720) the length 321, 352 of the downhole tool 320, 340 based on the first 314, 368 and second 324, 373 distances may comprise operating (730) a processing device 510 comprising a processor 512 and a memory storing computer program code 532 to determine the length 321, 352 of the downhole tool 320, 340 based on the first distance 314, 368 and the signal generated by the sensor 322, 366.

The method (700) may be performed at an oil and/or gas drilling wellsite 100. Accordingly, positioning (710) the first end of the downhole tool 316 in alignment with the first point 310, 356 and measuring (715) the second distance 324, 373 between the second point 315, 370 and the second end 318 of the downhole tool 320, 340 may be performed in conjunction with tubular handling equipment 116, 124, 134, 166, 182, such as a catwalk 166, of an oil and/or gas drilling rig 111 at the wellsite 100 or in conjunction with a rat hole 338 at the wellsite 100.

If the first distance 314, 368 is greater than the length 321, 352 of the downhole tool 320, 340, determining (720) the length 321, 352 of the downhole tool 320, 340 based on the first 314, 368 and second 324, 373 distances may comprise determining the length 321, 352 of the downhole tool 320, 340 by calculating (735) the difference between the first 314, 368 and second 324, 373 distances. However, if the first distance 314, 368 is less than the length 321, 352 of the downhole tool 320, 340, determining (720) the length 321, 352 of the downhole tool 320, 340 based on the first 314, 368 and second 324, 373 distances comprises determining the length 321, 352 of the downhole tool 320, 340 by calculating (740) the sum of the first 314, 368 and second 324, 373 distances.

A contact member 310, 356 may be aligned with the first point 310, 356, wherein positioning (710) the first end 316 of the downhole tool 320, 340 in alignment with the first point 310, 356 may comprise positioning (745) the first end 316 of the downhole tool 320, 340 in contact with the contact member 310, 356. The contact member 310 may be a first contact member 310. Accordingly, the method (700) may further comprise positioning (750) a second contact member 312 in contact with the second end 318 of the downhole tool 320, 340 such that measuring (715) the second distance 324 between the second point 315 and the second end 318 of the downhole tool 320, 340 comprises measuring (755) the second distance 324 between the second point 315 and the second contact member 312.

The second end 318 of the downhole tool 320, 340 may comprise a pin end 318 having a thread 328 and a face 332 at a base of the thread 328. Thus, positioning (750) the second contact member 312 in contact with the second end 318 of the downhole tool 320, 340 may comprise positioning (760) the second contact member 318 in contact with the face 332 of the pin end 318 of the downhole tool 320, 340.

The method (700) may further comprise measuring (765) a length 326 of the thread 328, such as by operating (770) a sensor 334, 366, 378, 386 to generate a signal indicative of the length 326 of the thread 328. The sensor 334, 366, 378, 386 may be or comprise a digital image camera 366. The signal may be a first signal and the sensor 378, 386 may comprise an emitter 378 operable to emit a second signal 380 and a receiver 386 operable to receive the second signal 380 and generate the first signal based on the second signal 380. The second signal 380 may comprise one or more of light, electromagnetic radiation, infrared radiation, and ultrasonic waves.

In view of the entirety of the present disclosure, including the figures and the claims, a person having ordinary skill in the art should readily recognize that the present disclosure introduces a method comprising: measuring a first distance between a first point and a second point; positioning a first end of a downhole tool in alignment with the first point; measuring a second distance between the second point and a second end of the downhole tool; and determining length of the downhole tool based on the first and second distances.

The downhole tool may be or comprise a drill pipe, a drill collar, or a casing joint.

The downhole tool may be or comprise a portion of a bottom hole assembly.

The first and second points may be positionally fixed.

The second distance may be substantially smaller than the length of the downhole tool.

The second distance may be between 1% and 20% of the length of the downhole tool.

Measuring the second distance between the second point and the second end of the downhole tool may comprise operating a sensor to generate a signal indicative of the second distance. In such implementations, among others within the scope of the present disclosure, the sensor may be or comprise a digital image camera. Determining the length of the downhole tool based on the first and second distances may comprise operating a processing device comprising a processor and a memory storing computer program code to determine the length of the downhole tool based on the first distance and the signal generated by the sensor.

The method may be performed at an oil and/or gas drilling wellsite. For example, positioning the first end of the downhole tool in alignment with the first point and measuring the second distance between the second point and the second end of the downhole tool may be performed in conjunction with tubular handling equipment of an oil and/or gas drilling rig at the wellsite. Positioning the first end of the downhole tool in alignment with the first point and measuring the second distance between the second point and the second end of the downhole tool may be performed in conjunction with a catwalk of an oil and/or gas drilling rig at the wellsite. Positioning the first end of the downhole tool in alignment with the first point and measuring the second distance between the second point and the second end of the downhole tool may be performed in conjunction with a rat hole at the wellsite.

If the first distance is greater than the length of the downhole tool, determining the length of the downhole tool based on the first and second distances may comprise determining the length of the downhole tool by calculating the difference between the first and second distances.

If the first distance is less than the length of the downhole tool, determining the length of the downhole tool based on the first and second distances may comprise determining the length of the downhole tool by calculating the sum of the first and second distances.

A contact member may be aligned with the first point, and positioning the first end of the downhole tool in alignment with the first point may comprise positioning the first end of the downhole tool in contact with the contact member. In such implementations, among others within the scope of the present disclosure, the contact member may be a first contact member, the method may further comprise positioning a second contact member in contact with the second end of the downhole tool, and measuring the second distance between the second point and the second end of the downhole tool may comprise measuring the second distance between the second point and the second contact member. The second end of the downhole tool may comprise a pin end having a thread and a face at a base of the thread, and positioning the second contact member in contact with the second end of the downhole tool may comprise positioning the second contact member in contact with the face of the pin end of the downhole tool.

The second end of the downhole tool may comprise a pin end having a thread, and the method may further comprise measuring a length of the thread. Measuring the length of the thread may comprise operating a sensor to generate a signal indicative of the length of the thread. The sensor may be or comprise a digital image camera. The signal may be a first signal, and the sensor may comprise: an emitter operable to emit a second signal; and a receiver operable to receive the second signal and generate the first signal based on the second signal. The second signal may comprise light, electromagnetic radiation, infrared radiation, and/or ultrasonic waves.

The present disclosure also introduces an apparatus comprising a tubular measuring system comprising: a sensor disposed at a predetermined location with respect to a datum, wherein the sensor is operable to generate a signal indicative of a tubular feature position relative to the sensor; and a processing device comprising a processor and a memory storing computer program code, wherein the processing device is operable to receive and process the signal to determine position of the tubular feature with respect to the datum.

The tubular may be a drill pipe, a drill collar, or a casing joint.

The tubular may be or comprise a downhole tool.

The tubular measuring system may be located at an oil and/or gas drilling wellsite. In such implementations, among others within the scope of the present disclosure, the sensor may be operable in conjunction with tubular handling equipment of an oil and/or gas drilling rig at the wellsite. The sensor may be operable in conjunction with a catwalk of an oil and/or gas drilling rig at the wellsite. The sensor may be operable in conjunction with a rat hole at the wellsite.

The sensor may be or comprise a digital image camera operable to generate a digital image of the tubular feature.

The signal may be a first signal, and the sensor may comprise: an emitter operable to emit a second signal; a receiver operable to receive a third signal resulting from interaction between the second signal and the tubular feature, wherein the first signal is or comprises the third signal.

The signal may be a first signal, and the sensor may comprise: an emitter operable to emit a second signal; a receiver operable to receive a third signal resulting from interaction between the second signal and the tubular feature; and a processor operable to generate the first signal based on the third signal. The second and third signals may each comprise light. In such implementations, among others within the scope of the present disclosure, the first signal may be not comprise light. The emitter may be operable to direct the light toward the tubular feature such that the third signal comprises a shadow image of the tubular feature. The second and third signals may each be electromagnetic radiation. In such implementations, among others within the scope of the present disclosure, the first signal may not be electromagnetic radiation. The second and third signals may each be infrared. In such implementations, among others within the scope of the present disclosure, the first signal may not be infrared. The second and third signals may each be ultrasonic. In such implementations, among others within the scope of the present disclosure, the first signal may not be ultrasonic.

The tubular feature may be a box or pin end connector of the tubular, and the processing device may be further operable to process the signal to determine a dimension of the box or pin end connector.

The tubular feature may be a first end of the tubular, a second end of the tubular may be positioned at the datum, and the processing device may be further operable to process the signal to determine length of the tubular based on the determined position of the tubular feature with respect to the datum. In such implementations, among others within the scope of the present disclosure, the first end of the tubular may be a pin end connector, and the second end of the tubular may be a box end connector.

The tubular feature may be a first end of the tubular, a second end of the tubular may be positioned at the datum, the sensor may be located a first distance from the datum, and the processing device may be further operable to: determine a second distance between the sensor and the tubular feature; and determine length of the tubular based on the first and second distances, wherein the first and second distances are measured with respect to a longitudinal axis of the tubular.

The sensor may be a first sensor, the predetermined location may be a first predetermined location, the signal may be a first signal, the tubular feature may be a first end of the tubular, the tubular feature position may be a first tubular end position, the position of the tubular feature with respect to the datum may be a first position of the first tubular end with respect to the datum, and the tubular sensing system may further comprise a second sensor at a second predetermined location with respect to the datum, wherein the second sensor may be operable to generate a second signal indicative of a second tubular end position of a second end of the tubular relative to the second sensor. In such implementations, among others within the scope of the present disclosure, the processing device may be operable to receive and process the first and second signals to: determine the first position of the first tubular end with respect to the datum; determine a second position of the second tubular end with respect to the datum; and determine length of the tubular based on the determined first and second positions of the respective first and second tubular ends.

The tubular feature may be a first end of the tubular, and the apparatus may further comprise: a first contact member positionally fixed relative to the datum and configured to be physically contacted by a second end of the tubular; and a second contact member carrying the sensor and configured to move toward and physically contact the first end of the tubular. In such implementations, among others within the scope of the present disclosure, the signal generated by the sensor may be indicative of a distance between the first and second contact members, and the processing device may be further operable to determine length of the tubular based on the signal generated by the sensor. The processing device may be further operable to cause the second contact member to move toward and physically contact the first end of the tubular.

The present disclosure also introduces an apparatus comprising a measuring system operable to determine length of a tubular, wherein the measuring system comprises: a first contact member positionally fixed at a first distance from a datum and configured to contact a first end of the tubular; a second contact member configured to move toward the first contact member to contact a second end of the tubular; a sensor operable to generate a signal indicative of a second distance between the datum and the second contact member when the first contact member is in contact with the first end of the tubular and the second contact member is in contact with the second end of the tubular; and a processing device operable to determine the length of the tubular based on the first distance and the signal.

The measuring system may be located at an oil and/or gas drilling wellsite. For example, the first contact member, the second contact member, and the sensor may collectively be operable in conjunction with tubular handling equipment of an oil and/or gas drilling rig at the wellsite. The first contact member, the second contact member, and the sensor may collectively be operable in conjunction with a catwalk of an oil and/or gas drilling rig at the wellsite. The first contact member, the second contact member, and the sensor may collectively be operable in conjunction with a rat hole at the wellsite.

The second end of the tubular may comprise a pin having a thread and a face at a base of the thread, and the second contact member may be operable to contact the face of the tubular.

The signal may be a first signal, the second end of the tubular may comprise a pin having a thread and a face at a base of the thread, and the measuring system may further comprise a third contact member operable to move into contact with the face. In such implementations, among others within the scope of the present disclosure, the measuring system may be further operable to generate a second signal indicative of a third distance between the second and third contact members, and the processing device may be operable to determine the length of the tubular based on the second signal. The processing device may be further operable to determine a thread length of the thread based on the second signal. The measuring system may further comprise a second sensor operable to generate the second signal.

The sensor may be or comprise a digital image camera.

The signal may be a first signal, and the sensor may comprise: an emitter operable to emit a second signal; and a receiver operable to receive the second signal and generate the first signal based on the second signal. The second signal may comprise light, electromagnetic radiation, infrared radiation, and/or ultrasonic waves.

The sensor may be operatively connected with at least one of the first and second contact members.

The present disclosure also introduces a method comprising: (A) transferring a tubular via tubular handling equipment disposed at an oil and/or gas drilling wellsite; (B) operating a sensor located at a predetermined location, relative to a datum at the wellsite, to generate a signal dependent upon a first characteristic of a feature of the tubular, wherein the first characteristic is a dimension or position of the tubular feature relative to the predetermined sensor location; and (C) operating a processing device comprising a processor and a memory storing computer program code to determine a second characteristic based on the signal, wherein the second characteristic is: (i) a dimension of the tubular or the tubular feature; or (ii) a position of the tubular or the tubular feature relative to the datum.

The tubular handling equipment may comprise the sensor.

The sensor may be or comprise a digital image camera, and operating the sensor may comprise generating a digital image of the tubular feature.

The signal may be a first signal, the sensor may comprise an emitter and a receiver, and operating the sensor may comprise: emitting a second signal; and receiving a third signal resulting from interaction between the second signal and the tubular feature, wherein the first signal is, comprises, or is based on the third signal. In such implementations, among others within the scope of the present disclosure, the second and third signals may be light signals, electromagnetic signals, infrared signals, and/or ultrasonic signals.

The tubular feature may be a box or pin end connector of the tubular, and the second characteristic may be a dimension of the box or pin end connector.

The tubular feature may be a first end of the tubular, a second end of the tubular may be positioned at the datum, and the second characteristic may be length of the tubular.

The sensor may be a first sensor, the signal may be a first signal, the tubular feature may a first end of the tubular, the predetermined sensor location may be a first predetermined sensor location, and the method may further comprise: operating a second sensor located at a second predetermined sensor location, relative to the datum, to generate a second signal dependent upon position of a second end of the tubular relative to the second predetermined sensor location; operating the processing device to determine position of the second tubular end relative to the datum based on the second signal; and operating the processing device to determine length of the tubular based on the determined positions of the first and second tubular ends relative to the datum.

The second characteristic may be determined while a top drive suspends a drill string comprising the tubular.

The second characteristic may be determined while the tubular is supported by an upper end of a drill string extending above a rig floor, the drill string being supported by slips in the rig floor.

The second characteristic may be determined while the tubular is disposed in a fingerboard of a drilling rig at the wellsite.

The second characteristic may be determined while the tubular is substantially horizontal.

The second characteristic may be determined while the tubular is substantially vertical.

The tubular may be a single joint of drill pipe.

The tubular may be a pipe stand comprising a plurality of drill pipe members.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. A method comprising:
  measuring a first distance between a first point and a second point;

positioning a first end of a downhole tool in alignment with the first point;
measuring a second distance between the second point and a second end of the downhole tool; and
determining length of the downhole tool based on the first and second distances.

2. The method of claim 1 wherein the downhole tool comprises a drill pipe, a drill collar, or a casing joint.

3. The method of claim 1 wherein the downhole tool comprises a portion of a bottom hole assembly.

4. The method of claim 1 wherein the first and second points are positionally fixed.

5. The method of claim 1 wherein the second distance is substantially smaller than the length of the downhole tool.

6. The method of claim 1 wherein the second distance is between 1% and 20% of the length of the downhole tool.

7. The method of claim 1 wherein measuring the second distance between the second point and the second end of the downhole tool comprises operating a sensor to generate a signal indicative of the second distance.

8. The method of claim 7 wherein the sensor comprises a digital image camera.

9. The method of claim 7 wherein determining the length of the downhole tool based on the first and second distances comprises operating a processing device comprising a processor and a memory storing computer program code to determine the length of the downhole tool based on the first distance and the signal generated by the sensor.

10. The method of claim 1 is performed at an oil and/or gas drilling wellsite.

11. The method of claim 10 wherein positioning the first end of the downhole tool in alignment with the first point and measuring the second distance are performed in conjunction with tubular handling equipment of an oil and/or gas drilling rig at the wellsite.

12. The method of claim 10 wherein positioning the first end of the downhole tool in alignment with the first point and measuring the second distance are performed in conjunction with a catwalk of an oil and/or gas drilling rig at the wellsite.

13. The method of claim 10 wherein positioning the first end of the downhole tool in alignment with the first point and measuring the second distance are performed in conjunction with a rat hole at the wellsite.

14. The method of claim 1 wherein the first distance is greater than the length of the downhole tool, and wherein determining the length of the downhole tool based on the first and second distances comprises determining the length of the downhole tool by calculating the difference between the first and second distances.

15. The method of claim 1 wherein the first distance is less than the length of the downhole tool, and wherein determining the length of the downhole tool based on the first and second distances comprises determining the length of the downhole tool by calculating the sum of the first and second distances.

16. The method of claim 1 wherein a contact member is aligned with the first point, and wherein positioning the first end of the downhole tool in alignment with the first point comprises positioning the first end of the downhole tool in contact with the contact member.

17. The method of claim 16 wherein the contact member is a first contact member, wherein the method further comprises positioning a second contact member in contact with the second end of the downhole tool, and wherein measuring the second distance comprises measuring the second distance between the second point and the second contact member.

18. The method of claim 17 wherein the second end of the downhole tool comprises a pin end having an external thread and a face at a base of the thread, and wherein positioning the second contact member in contact with the second end of the downhole tool comprises positioning the second contact member in contact with the face of the pin end of the downhole tool.

19. The method of claim 1 wherein the second end of the downhole tool comprises a pin end having an external thread, and wherein the method further comprises measuring a length of the thread.

20. The method of claim 19 wherein measuring the length of the thread comprises operating a sensor to generate a signal indicative of the length of the thread.

21. The method of claim 20 wherein the sensor comprises a digital image camera.

22. The method of claim 20 wherein the signal is a first signal, and wherein the sensor comprises:
an emitter operable to emit a second signal; and
a receiver operable to receive the second signal and generate the first signal based on the second signal.

23. The method of claim 22 wherein the second signal comprises light.

24. The method of claim 22 wherein the second signal is electromagnetic radiation.

25. The method of claim 22 wherein the second signal comprises infrared radiation.

26. The method of claim 22 wherein the second signal comprises ultrasonic waves.

27. An apparatus comprising:
a tubular measuring system comprising:
a sensor disposed at a predetermined location with respect to a datum, wherein the sensor is operable to generate a signal indicative of a tubular feature position relative to the sensor; and
a processing device comprising a processor and a memory storing computer program code, wherein the processing device is operable to receive and process the signal to determine position of the tubular feature with respect to the datum,
wherein the tubular feature is a box or pin end connector of a tubular, and
wherein the processing device is further operable to process the signal to determine a dimension of the box or pin end connector.

28. The apparatus of claim 27 wherein the tubular comprises a drill pipe, a drill collar, a casing joint, and/or a downhole tool, and wherein the tubular measuring system is located at an oil and/or gas drilling wellsite.

29. The apparatus of claim 28 wherein the sensor is operable in conjunction with tubular handling equipment of an oil and/or gas drilling rig at the wellsite.

30. The apparatus of claim 28 wherein the sensor is operable in conjunction with a catwalk of an oil and/or gas drilling rig at the wellsite.

31. The apparatus of claim 27 wherein the sensor comprises a digital image camera operable to generate a digital image of the tubular feature.

32. An apparatus comprising:
a measuring system operable to determine length of a tubular, wherein the measuring system comprises:
a first contact member positionally fixed at a first distance from a datum and configured to contact a first end of the tubular;

a second contact member configured to move toward the first contact member to contact a second end of the tubular;

a sensor operable to generate a signal indicative of a second distance between the datum and the second contact member when the first contact member is in contact with the first end of the tubular and the second contact member is in contact with the second end of the tubular; and a processing device operable to determine the length of the tubular based on the first distance and the signal.

33. The apparatus of claim 32 wherein:
the measuring system is located at an oil and/or gas drilling wellsite; and
the first contact member, the second contact member, and the sensor are collectively operable in conjunction with tubular handling equipment of an oil and/or gas drilling rig at the well site.

34. The apparatus of claim 32 wherein the second end of the tubular comprises a pin having an external thread and a face at a base of the thread, and wherein the second contact member is operable to contact the face of the tubular.

35. The apparatus of claim 32 wherein:
the signal is a first signal;
the second end of the tubular comprises a pin having an external thread and a face at a base of the thread;
the measuring system further comprises a third contact member operable to move into contact with the face;
the measuring system is further operable to generate a second signal indicative of a third distance between the second and third contact members; and
the processing device is operable to determine the length of the tubular based on the second signal.

36. The apparatus of claim 32 wherein the sensor is operatively connected with at least one of the first and second contact members.

37. A method comprising:
transferring a tubular via tubular handling equipment disposed at an oil and/or gas drilling wellsite;
operating a sensor located at a predetermined location, relative to a datum at the wellsite, to generate a signal dependent upon a first characteristic of a feature of the tubular, wherein the first characteristic is a dimension or position of the tubular feature relative to the predetermined sensor location; and
operating a processing device comprising a processor and a memory storing computer program code to determine a second characteristic based on the signal, wherein the second characteristic is:
a dimension of the tubular or the tubular feature; or
a position of the tubular or the tubular feature relative to the datum.

38. The method of claim 37 wherein the tubular handling equipment comprises the sensor.

39. The method of claim 37 wherein the sensor comprises a digital image camera, and wherein operating the sensor comprises generating a digital image of the tubular feature.

40. The method of claim 37 wherein the signal is a first signal, wherein the sensor comprises an emitter and a receiver, and wherein operating the sensor comprises:
emitting a second signal; and
receiving a third signal resulting from interaction between the second signal and the tubular feature, wherein the first signal is, comprises, or is based on the third signal.

41. The method of claim 37 wherein the tubular feature is a box or pin end connector of the tubular, and wherein the second characteristic is a dimension of the box or pin end connector.

42. The method of claim 37 wherein the tubular feature is a first end of the tubular, wherein a second end of the tubular is positioned at the datum, and wherein the second characteristic is length of the tubular.

43. The method of claim 37 wherein:
the sensor is a first sensor;
the signal is a first signal;
the tubular feature is a first end of the tubular;
the predetermined sensor location is a first predetermined sensor location; and
the method further comprises:
operating a second sensor located at a second predetermined sensor location, relative to the datum, to generate a second signal dependent upon position of a second end of the tubular relative to the second predetermined sensor location;
operating the processing device to determine position of the second tubular end relative to the datum based on the second signal; and
operating the processing device to determine length of the tubular based on the determined positions of the first and second tubular ends relative to the datum.

44. The method of claim 37 wherein the second characteristic is determined while a top drive suspends a drill string comprising the tubular.

45. The method of claim 37 wherein the second characteristic is determined while the tubular is supported by an upper end of a drill string extending above a rig floor, the drill string being supported by slips in the rig floor.

46. The method of claim 37 wherein the second characteristic is determined while the tubular is disposed in a fingerboard of a drilling rig at the wellsite.

47. The method of claim 37 wherein the second characteristic is determined while the tubular is substantially horizontal.

48. The method of claim 37 wherein the second characteristic is determined while the tubular is substantially vertical.

* * * * *